US012136287B2

(12) United States Patent
Tagra et al.

(10) Patent No.: US 12,136,287 B2
(45) Date of Patent: *Nov. 5, 2024

(54) ASIDES DETECTION IN DOCUMENTS

(71) Applicant: Adobe Inc., San Jose, CA (US)

(72) Inventors: Sanjeev Tagra, Panipat (IN); Shawn Alan Gaither, Raleigh, NC (US); Shagun Kush, Karnal (IN); Samarth Gupta, Ghaziabad (IN); Sachin Soni, New Delhi (IN); Nikolaos Barmpalios, Sunnyvale, CA (US); Abhishek Jain, Delhi (IN); Naqushab Neyazee, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,433

(22) Filed: Feb. 17, 2022

(65) Prior Publication Data

US 2022/0172501 A1  Jun. 2, 2022

Related U.S. Application Data

(63) Continuation of application No. 16/598,680, filed on Oct. 10, 2019, now Pat. No. 11,256,913.

(51) Int. Cl.
| | | |
|---|---|---|
| *G06F 17/00* | (2019.01) | |
| *G06F 40/106* | (2020.01) | |
| *G06F 40/114* | (2020.01) | |
| *G06V 30/414* | (2022.01) | |
| *G06V 30/416* | (2022.01) | |

(52) U.S. Cl.
CPC .......... *G06V 30/414* (2022.01); *G06F 40/106* (2020.01); *G06F 40/114* (2020.01); *G06V 30/416* (2022.01)

(58) Field of Classification Search
CPC .. G06V 30/414; G06V 30/416; G06F 40/114; G06F 40/106; G06F 40/169; G06F 40/171; G06F 40/103
USPC ........................................................ 382/254
See application file for complete search history.

(56) References Cited

U.S. PATENT DOCUMENTS

| | | | |
|---|---|---|---|
| 5,528,743 A * | 6/1996 | Tou ........................ | G06F 40/189 |
| | | | 382/292 |
| 5,588,072 A | 12/1996 | Wang | |
| 8,254,681 B1 | 8/2012 | Poncin et al. | |
| 10,013,488 B1 * | 7/2018 | Zhao .................... | G06F 16/7335 |

(Continued)

*Primary Examiner* — Jason T Edwards
(74) *Attorney, Agent, or Firm* — Finch & Maloney PLLC

(57) ABSTRACT

Techniques are disclosed for identifying asides within a document, and detecting a display order of contents based of the identified asides. In a document, an "aside" represents a content region of the document that is distinct from the main content regions, and may be visually distinguishable from the main content region. In an example, a document is received, where the document lacks identification of asides. The document is analyzed to identify asides within the document. A display order of contents within the document is then determined, based on the identified asides. For example, in the display order, the asides are ordered between two segments of the main content and/or at a beginning or an end of the main content, but may not be ordered to be embedded in between a segment of the main content. The document is displayed in accordance with the display order.

17 Claims, 31 Drawing Sheets

(56) References Cited

U.S. PATENT DOCUMENTS

| | | |
|---|---|---|
| 10,949,604 B1 | 3/2021 | Dwivedi et al. |
| 10,956,731 B1 | 3/2021 | Gupta et al. |
| 2003/0014445 A1* | 1/2003 | Formanek ............. G06F 40/103 707/E17.121 |
| 2003/0128234 A1* | 7/2003 | Brown ................. G06F 16/972 715/744 |
| 2004/0252888 A1* | 12/2004 | Bargeron ........... G06V 30/1423 382/188 |
| 2007/0009161 A1 | 1/2007 | Hollingsworth |
| 2007/0237428 A1 | 10/2007 | Goodwin et al. |
| 2008/0098294 A1* | 4/2008 | Le ........................ G06F 40/169 715/230 |
| 2008/0114757 A1* | 5/2008 | Dejean ................. G06F 16/258 707/E17.084 |
| 2013/0191715 A1 | 7/2013 | Raskovic et al. |
| 2014/0215308 A1* | 7/2014 | Cantrell ............. G06F 16/9577 715/234 |
| 2015/0067483 A1* | 3/2015 | Demiya ............... G06F 40/171 715/249 |
| 2015/0154660 A1 | 6/2015 | Weald et al. |
| 2016/0217343 A1 | 7/2016 | Hoffman et al. |
| 2017/0046317 A1 | 2/2017 | Geva et al. |
| 2019/0278833 A1 | 9/2019 | Mukherjee |
| 2019/0294641 A1 | 9/2019 | Alexeev et al. |
| 2020/0034611 A1 | 1/2020 | Hosabettu et al. |

\* cited by examiner

Gravity

Gravity (from Latin gravitas, meaning 'weight'), or gravitation, is a natural phenomenon by which all things with mass or energy—including planets, stars, galaxies, and even light - are brought toward (or gravitate toward) one another. On Earth, gravity gives weight to physical objects, and the Moon's gravity causes the ocean tides. The gravitational attraction of the original

*Sir Isaac Newton was first to formulate laws of gravity* gaseous matter present in the Universe caused it to begin coalescing, forming stars—and for the stars to group together into galaxies—so gravity is responsible for many of the large-scale structures in the Universe. Gravity has an infinite range, although its effects become increasingly weaker on farther objects.

Gravity has an infinite range, although its effects become increasingly weaker on farther objects. Gravity is most accurately described by the general theory of relativity.

Isaac Newton

Earth's gravity

Every planetary body (including the Earth) is surrounded by its own gravitational field, which can be conceptualized with Newtonian physics as exerting an attractive force on all objects. Assuming a spherically symmetrical planet, the strength of this field at any given point above the surface is proportional to the planetary body's mass and inversely proportional to the square of the distance from the center of the body.

*Newton was inspired to formulate his theory of gravitation by watching an apple fall from a tree.*

The gravity on Mars is about 38% of that on Earth. So if you weigh 100 pounds on Earth, you would weigh only 38 pounds on Mars

The strength of the gravitational field is numerically equal to the acceleration of objects under its influence. The rate of acceleration of falling objects near the Earth's surface varies very slightly depending on latitude, surface features such as mountains and ridges.

FIG. 3A

Document 300 displayed in the display screen 142 (Unsatisfactorily ordered, without taking into account the asides)

Gravity
Gravity (from Latin gravitas, meaning 'weight'), or gravitation, is a natural phenomenon by which all things with mass or energy—including planets, stars, galaxies, and even light - are brought toward (or gravitate toward) one another. On Earth, gravity gives weight to physical objects, and the Moon's gravity causes the ocean tides. The gravitational attraction of the original Sir Isaac Newton was first to formulate laws of gravity — 308a gaseous matter present in the Universe caused it to begin coalescing, forming stars—and for the stars to group together into galaxies—so gravity is responsible for many of the large-scale structures in the Universe. Gravity has an infinite range, although its effects become increasingly weaker on farther objects.

Gravity has an infinite range, although its effects become increasingly weaker on farther objects. Gravity is most accurately described by the general theory of relativity.

 308b

Isaac Newton

Earth's gravity
Every planetary body (including the Earth) is surrounded by its own gravitational field, which can be conceptualized with Newtonian physics as exerting an attractive force on all objects. Assuming a spherically

Document 300 displayed in the display screen 142 (Satisfactorily ordered, taking into account the asides)

Gravity

Gravity (from Latin gravitas, meaning 'weight'), or gravitation, is a natural phenomenon by which all things with mass or energy—including planets, stars, galaxies, and even light - are brought toward (or gravitate toward) one another. On Earth, gravity gives weight to physical objects, and the Moon's gravity causes the ocean tides. The gravitational attraction of the original gaseous matter present in the Universe caused it to begin coalescing, forming stars—and for the stars to group together into galaxies—so gravity is responsible for many of the large-scale structures in the Universe. Gravity has an infinite range, although its effects become increasingly weaker on farther objects.

Gravity has an infinite range, although its effects become increasingly weaker on farther objects. Gravity is most accurately described by the general theory of relativity.

Sir Isaac Newton 308a was first to formulate laws of gravity

Isaac Newton 308b

Newton was inspired to formulate his theory of gravitation by watching an apple fall from a tree. 308c

Earth's gravity

Every planetary body (including the Earth) is surrounded by its own gravitational field, which can be . . .

404

Identify various objects in a document, in the order of their appearance in the page (404a)

For each object, identify corresponding object information, where object information of an object includes positioning information of the object, styling attributes, and/or any other relevant information (404b)

If appropriate, merge two or more objects into a corresponding region, such that the plurality of regions is identified, each region including a corresponding one or more objects (404c)

Create an empty list of regions.
For all objects in the list:

Test if current object can be merged with last region in the region-list by following logic:

(i) Current object should be below the region;

(ii) Current object and region should have some common overlap of horizontal span (by a factor of minimum of the widths of the current object and the region);

(iii) Vertical Gap between two objects should be under a defined threshold; and/or (iv) If both objects are of significant height, their styling should be similar. This is to ensure that two regions that are close (one of them is aside) don't get merged in one region. Significant height ensures that cases like headings with paragraphs are merged.

(A) If one or more (e.g., all) of the above (i), ..., (iv) criteria are satisfied, then merge the object in the region.

Else (B) Check if that object can be merged with other regions already created. This is to ensure that even objects those are vertically stacked but are not present in continuous order in content stream get merged into correct region.

Else (C) Create a new region from the current object and add it to regions list.

Now merge all those pairs of regions where one region completely contains the other (e.g., it is possible in case one of the smaller regions is an image).

Define 4 different Sections on page:

(i) topPane = Strip on top of page with height as H1% (e.g., about 15%) of page.

(ii) bottomPane = Strip on bottom of page with height as W1% (e.g., about 15%) of page.

(iii) leftPane = Strip on left of Page with width as W2% (e.g., about 45%) of width of page.

(iv) rightPane = Strip on right of Page with width as H2% (e.g., about 45%) of right of page.

For every region identified in operations 404 of the method 400:

(A) If region intersects with topPane => Not an aside candidate.

(B) If region intersects with bottomPane => Not an aside candidate.

(C) If region completely lies in leftPane or rightRane => Identify as possible aside candidate.

(D) The identified aside candidate regions are analyzed to find horizontally symmetrical regions, and such horizontally symmetrical regions are removed from being aside candidates.

(E) Asides candidates with height or width less that a particular threshold are then removed.

FIG. 4D

For all objects on page, collect all different font styles       412

Assess and get dominant font style of the page area - [1]
437 { From all collected font styles, Get num lines in each style
DominantFontStyle = Font Style with max num lines on page For all aside candidates
    From content on page
438 { Check If Bounds of content lies within bound of aside candidate
        Add to List for AsideCandidate Content
        Collect font style of content in a list
    Remove Invalid regions from Aside Candidate Content list
439 { If there is only one element and the element is a heading-erase it
        If only figure and Caption are present – erase the list
        Erase footnotes from the list
        Erase header footer from the list
        If single element is in the list and the element is table – remove it
        If all elements are figures only – erase list For remaining valid content list for the aside candidate
441 { Check Dominant Font size of the aside candidate using [1]
443 { If dominant font size of candidate region is different than that of the page, mark as valid aside
Else
    Check for Co-relation with Page Font styles
445 { Get Magnitude of Page Font Style List and Aside Font Style List
    For each fontstyle
        fontCount = fontstyle-> count
        Magnitude += fontCount * fontCount
    Magnitude = sqrt(Magnitude) –[2]
    Magnitude1 = Magnitude(pagefontstyle List) from [2]
    Magnitude2 = Magnitude(asideFontStyle List) from [2]
    For all [fstyl in FontStyles] in the page font style list
        Fontstyle2 = Find fstyl in Aside font style list
        If Fontstyle2 is not null
            Fontcount1 = fstyl->Count / Magnitude1
            Fontcount2 = Fontstyle2 ->Count / Magnitude2
            Correlation += (Fontcount1 * Fontcount2)
    Return Correlation
447 { If Correlation is less than 20% then mark as Valid Aside candidate For Valid Aside
449 { Create a new Region with Tag Aside – [3]
Insert Aside Tag in content tree before the first region in the AsideCandidate content list
Sort the candidates inside the AsideCandidate content list by vertical positioning
For all regions in AsideCandidate content list, append region to created New region tagged as Aside – from [3]
After all asides have been evaluated from aside candidates, Recalculate bounds of the page and objects on page.

FIG. 4E

ABC Journal on Computer, vol. A, Dec. 2019

Computer Architecture For Better Detection of Asides in Documents

John Doe,[1] Jane Doe[2]

*Abstract:* This paper is about detection of asides. This paper is about detection of asides. This paper is about detection of asides. This paper is about detection of asides.

I. INTRODUCTION

This paper details what asides are. This paper details what asides are. This paper details what asides are. This paper details what asides are. This paper details what asides are. This paper details what asides are. This paper details what asides are. This paper details what asides are. This paper details what asides are.

Manuscript received Sept. 8, 2019
1. john.doe@univ.edu, Student, University
1. jane.doe@univ.edu, Professor, University

II. BACKGROUND

This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background.

0018-9344 / 2019 / 120-09765 $12 JOC

FIG. 5E

ABC Journal on Computer, vol. A, Dec. 2019

Computer Architecture For Better Detection of Asides in Documents

| 1st Author | 2nd Author | 3rd Author |
| 1st author's institute affiliation | 2nd author's institute affiliation | 3rd author's institute affiliation |
| Telephone number | Telephone number | Telephone number |
| 1st author's E-mail address | 2nd E-mail address | 3rd E-mail address |

544a  544b  544c

*Abstract*: This paper is about detection of asides. This paper is about detection of asides. This paper is about detection of asides. This paper is about detection of asides.

I. INTRODUCTION

This paper details what asides are. This paper details what asides are. This paper details what asides are. This paper details what asides are. This paper details what asides are. This paper details what asides are. This paper details what asides are. This paper details what asides are.

Manuscript received Sept. 8, 2019
1. john.doe@univ.edu, Student, University
1. jane.doe@univ.edu, Professor, University

II. BACKGROUND

This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background. This sections talks about background.

0018-9344 / 2019 / 120-09765 $12 JOC

ABC company annual report

554a:
was a seminar on ABC company.

The emerging ABC company
ABC company has achieved a growth of 10% each year, over the last 5 years. ABC company has achieved a growth of 10% each year, over the last 5 years. ABC company has achieved a growth of 10% each year, over the last 5 years.

Patent portfolio of ABC
ABC company has received 100 patents in the last one year. ABC company has received 100 patents in the last one year. ABC company has received 100 patents in the last one year. ABC company has received 100 patents in the last one year.

554b:
Company ABC is awarded best employee award and is fortune 100 company and is the best company in the country. Company ABC is the best company.

FIG. 5H

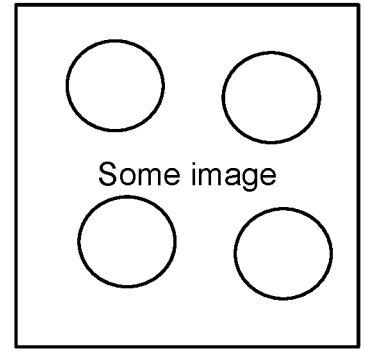

Business journal

*ABC company, headquartered in Portland, OR, has offices all over the world. ABC company, headquartered in Portland, OR, has offices all over the world.*

*For more information, contact:*
*Xxxx, Director, ABC company*

564a

In this issue

ABC .... 1

Trade balance ... 3

Trade deficit ... 4

564b

HOW A SMALL COMPANY IS SAVING THE WORLD

A small company, ABC company, in the US is planting trees to save the world. A small company in the US is planting trees to save the world. A small company in the US is planting trees to save the world.

A small company in the US is planting trees to save the world. A small company in the US is planting trees to save the world. A small company in the US is planting trees to save the world.

A small company in the US is planting trees to save the world.

Some image

A small company, ABC company, in the US is planting trees to save the world. A small company in the US is planting trees to save the world. A small company in the US is planting trees to save the world.

PERSONAL INSURANCE PRODUCTS

*In addition to your insurance needs, ABC insurance has coverage customized to meet the need of professionals professional in all spheres of life.* — 702a

*Homeowners*
XXXXXXXXXXXX XXXX XX XX XX XX XXX XX XX
XX XX XXXXXX XXXXXXXXXXXX XXXX XX XX XX
XX XXX XX XX XX XX XXXXXX XXXXXXXXXXXX
XXXX XX XX XX XX XXX XX XX XX XX XXXXXX
XXXXXXXXXXXX XXXX XX XX XX XX XXX XX XX
XX XX XXXXXX

*Auto-insurances*
XXXXXXXXXXXX XXXX XX XX XX XX XXX XX XX
XX XX XXXXXX XXXXXXXXXXXX XXXX XX XX XX
XX XXX XX XX XX XX XXXXXX XXXXXXXXXXXX
XXXX XX XX XX XX XXX XX XX XX XX XXXXXX
XXXXXXXXXXXX XXXX XX XX XX XX XXX XX XX
XX XX XXXXXX

*Personal Umbrellas*
XXXXXXXXXXXX XXXX XX XX XX XX XXX XX XX
XX XX XXXXXX XXXXXXXXXXXX XXXX XX XX XX
XX XXX XX XX XX XX XXXXXX XXXXXXXXXXXX
XXXX XX XX XX XX XXX XX XX XX XX XXXXXX
XXXXXXXXXXXX XXXX XX XX XX XX XXX XX XX
XX XX XXXXXX

*Boat Insurances*
XXXXXXXXXXXX XXXX XX XX XX XX XXX XX XX
XX XX XXXXXX XXXXXXXXXXXX XXXX XX XX XX
XX XXX XX X 706a How percentage of Americans have insurance?

Homeowners -- 70%
Auto            -- 80%
Umbrella    -- 10%
Boat            -- 8%

FIG. 7E

ASIDES DETECTION IN DOCUMENTS

CROSS REFERENCE TO RELATED APPLICATIONS

This application is a continuation of U.S. patent application Ser. No. 16/598,680 (filed 10 Oct. 2019), the entire disclosure of which is hereby incorporated herein by reference.

FIELD OF THE DISCLOSURE

This disclosure relates generally to digital document processing, and more specifically to techniques for detecting asides within a digital document.

BACKGROUND

In a document, an "aside" represents a content region of the document that is distinct from the main content regions of the document, and may be visually distinguishable from the main content region. For example, an aside may be presented as a sidebar that provides supplemental or additional information related to content in the nearby main content region. Another example of an aside is a call-out box that repeats or paraphrases content of the nearby main content region. In a more general sense, an aside can include any type of content the document designer decides to include in that aside. Some asides have a border, while other asides are borderless. The content within an aside may have different style attributes than that of the content within the main content region. For instance, the text within an aside may have a different font or font size, relative to the text in the main content region. Color and italics are other example attributes that might be utilized within an aside, although there are numerous other style attributes that can be varied, as will be appreciated.

Some digital documents include tags that identify regions of the documents. The tags can be used, for instance, to assist in presenting the different regions of the document in a proper reading order. However, often times, a document may not include such tags. Hence, in such a document, the various regions of a given document, including any asides, are not readily identifiable or distinguishable by a system that processes the document for presentation on a display screen. As a result, regions of the document, including the asides, may be presented for display in an incorrect order.

For example, the asides of a given document may be incorrectly merged with main content. This problem is exacerbated when the document is displayed on a relatively small display screen, such as the screen of a smart phone, tablet, or other relatively small display device. For instance, when displaying the document via such a screen, the asides may not be displayed as a sidebar on a side of the main content, because of the constrained display screen width. In any such cases, if the asides are not positioned at correct logical positions with respect to the main content, the reading order may result in a poor user experience for a reader consuming the document on a small display screen.

SUMMARY

Techniques are disclosed for identifying asides within a document, and ordering contents of the document based on the identified asides. The ordered content can then be sequentially presented for consumption according to the resulting order. For example, a document is received, where the document includes one or more asides, but lacks any identification of the asides. For example, due to the manner in which the document was created, the document may lack any tag or identifiers that can be used to readily identify an aside region of the document. In some embodiments of the present disclosure, an aside detection system identifies a region of the document as an aside, based at least in part on (i) geometrical information associated with the region, and (ii) styling attributes of content within the region. Example geometrical information associated with the region includes, for instance, the position of the region relative to the page of the document on which the region is located, the size of the region, or any other information that can be used to identify the position and/or size of the region (e.g., proximity of an edge of the region to an edge of the page, whether or not the region is intersected by a vertical center line of the page and/or a horizontal center line of the page, the amount of vertical space and/or horizontal space between the main content and the region, to name a few examples). Example styling attributes include, for instance, attributes such as font type, text size, text color, and text properties such as bold or italics. As will be appreciated, content within an aside of a given document oftentimes has one or more different style attributes than the main content of that document. However, the techniques provided herein do not require such style attribute differences, as will be explained in turn. In some embodiments, a content ordering module determines a display order in which content regions of the document are to be displayed. For example, the display order may be based at least in part on the region being identified as an aside (or not an aside, as the case may be). In some such embodiments, a content presentation module causes display of the various document regions in accordance with the determined display order. In some such cases, an identified aside may be presented for display, for example, at the end of a related section of the main content, rather than within the middle of that main content section, so as to not break the reading flow of the document. Numerous benefits and other embodiments will be apparent in light of this disclosure.

BRIEF DESCRIPTION OF THE DRAWINGS

FIG. 3A illustrates an example document including borderless and bordered asides, which may be detected by borderless and bordered aside detection module(s), in accordance with some embodiments of this disclosure.

FIG. 3C illustrates a display of the document of FIG. 3A on a display screen, based on the ordering of FIG. 3B.

FIG. 3E illustrates a display of the document of FIG. 3A on the display screen, based on the ordering of FIG. 3D, in accordance with some embodiments of this disclosure.

FIG. 4B is a flowchart illustrating an example method for identifying a plurality of regions in a document, in accordance with some embodiments of the present disclosure.

FIG. 4C illustrates an example methodology for identifying regions within a document, by opportunistically merging two or more objects within the document, in accordance with an embodiment of the present disclosure.

FIG. 4D illustrates a methodology for identifying one or more as regions within a document probable candidates for asides, in accordance with an embodiment of the present disclosure.

FIG. 4E illustrates an example methodology for analyzing contents of various candidate regions, to confirm one or more of the candidate aside regions as asides, in accordance with an embodiment of the present disclosure.

FIGS. 5A-5L illustrate various examples documents that are discussed with respect to the example methodologies of FIGS. 4A-4E, in accordance with some embodiments of the present disclosure.

FIGS. 7A-7F illustrate various examples documents that are discussed with respect to the method of FIG. 6, in accordance with some embodiments of the present disclosure.

DETAILED DESCRIPTION

Figure 1:
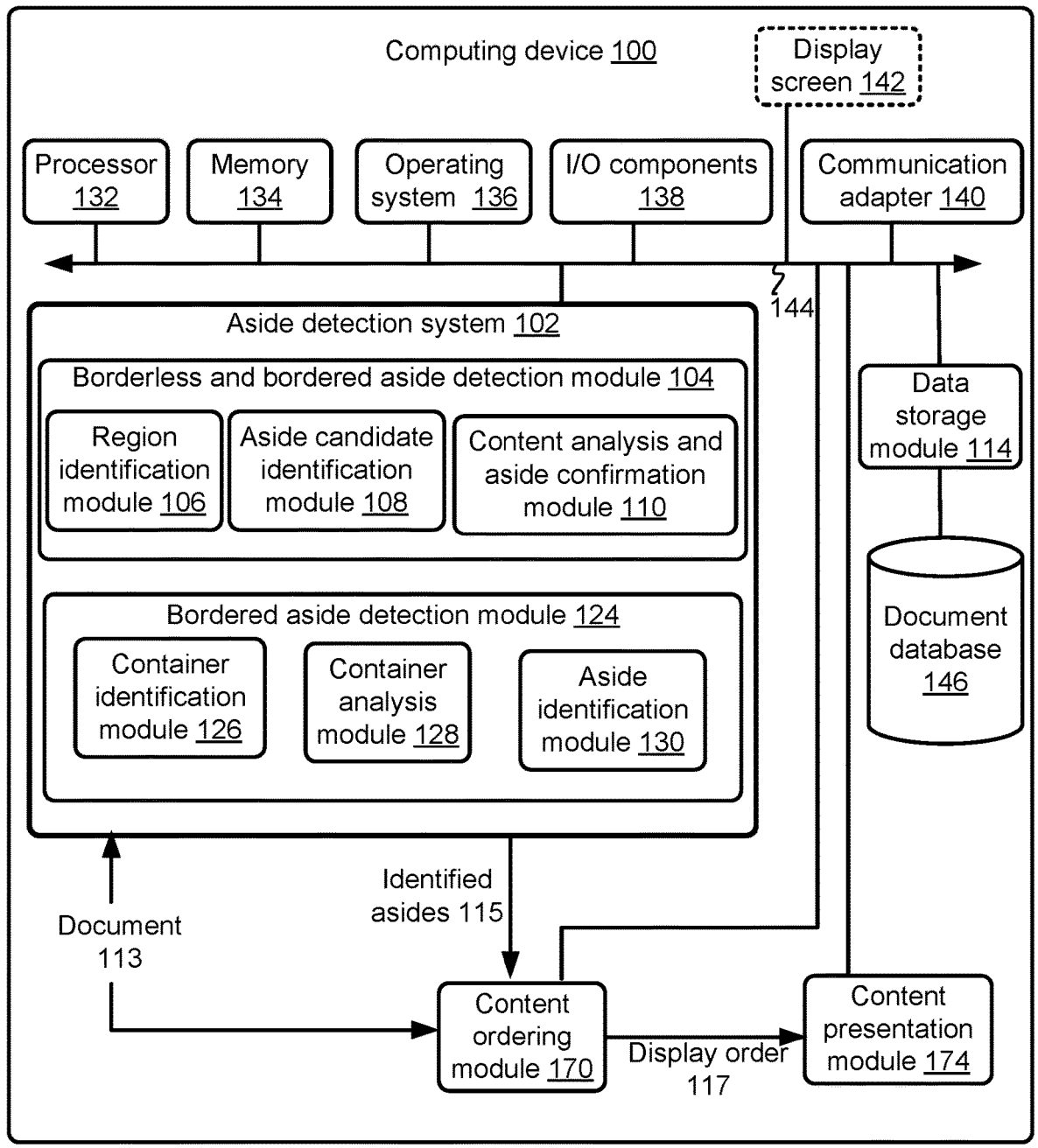
FIG. 1 is a block diagram schematically illustrating selected components of an example computing device configured to identify asides within a document, and to determine a display order of contents within the document based on the identified asides, in accordance with some embodiments.

Techniques are disclosed for identifying asides within a document, and determining a display order of contents within the document taking into account or otherwise based on the asides. As previously explained, an "aside" represents a content region of the document that is distinct from the main content regions of the document. In general, an aside can include any type of content and any number of style attributes. An aside may be bordered or borderless (some documents include both bordered and borderless asides). The techniques may be embodied in a system for presenting content for consumption by a user, such as a mobile display device (e.g., touchscreen phone or computing device) having a document reader application installed thereon, although any number of display systems can utilize the techniques. In any case, a digital document is received, and may lack identification of asides within the document. The system is programmed or otherwise configured to analyze the document to identify one or more asides within the document. A display order of contents within the document is then determined, taking into account the identified asides. For example, in the display order, the asides are ordered between two distinct regions of the main content (e.g., between two paragraphs) and/or at a beginning or an end of the main content. Conversely, the display order prevents the asides from incorrectly being, for example, embedded within the middle of a main content region (such as in the middle of a paragraph of the main content section), according to some embodiments. The determined order can vary from one embodiment to the next. In any case, the document is displayed in accordance with the determined order.

General Overview

As previously explained, there exists a number of non-trivial issues associated with displaying a document in which there are untagged or otherwise unidentified asides. This is particularly true when viewing such a document on a relatively small display screen. For example, assume a given document is originally authored as a long-form document meant for viewing on a relatively large screen, such as a screen of a laptop or a desktop computer. The document may be originally authored, merely as an example, for "A4" size viewing, where A4 size typically has dimensions of 8.27×11.69 inches. Further assume that the document is to now be displayed on a relatively small display screen (e.g., having a width less than 8.27 inches, such as display screens of mobile devices). To facilitate viewing of the document on such a small screen, the contents of the document can be re-ordered. Merely as an example, contents of a two-column or three-column document can be re-ordered to a single-column, as the width of the small display screen may be able to better accommodate one long column rather than laterally adjacent columns. Continuing with the above example, further assume the document includes one or more asides. When the document is to be displayed on a relatively large display screen, the document contents including the asides can be readily displayed in their original layout without issue. However, the width of a relatively narrow display screen tends to preclude useful display of the asides according to the original layout (e.g., the asides and other content of the document would be very small and difficult to read for the average person). Thus, while displaying the document on the display screen, an aside may have to be displayed vertically between two distinct sections of the main content (e.g., such as between paragraphs or other logical content sections), or at a beginning or an end of the main content, or elsewhere within the main content. Hence, and as will be appreciated in light of the disclosure, identifying and ordering of various regions/sections and asides of the document can be helpful in facilitating display of that content on a relatively small display screen. In particular, the ordered portions of the document may be sequentially presented for display according to this display order (also referred to as a reading order). Note that the ordering can be logically determined, such that asides can be purposefully placed within the order rather than assigned a random position within the order.

Thus, techniques are provided herein for detecting asides and other regions within a document that is to be displayed. The document need not include tags or other identification of such asides. Once the various regions and asides are detected, the techniques further include assigning a display order to the regions, where the ordering takes into account the identified asides. Thus, the asides appear in a logical position within the display order, rather than arbitrarily placed, for example, within the middle of a paragraph, or embedded within a section of the main content, or in some other location that breaks the natural flow and readability of the document, according to some embodiments.

As will be discussed in further detail, an aside can be a borderless aside or a bordered aside. For example, a bordered aside may be: within a bounding box that forms a boundary of the aside, a graphical object that has a well-defined boundary, and/or an area that has a background color different from a background color of main content sections of the document which effectively provides a well-defined boundary. On the other hand, a borderless aside does not have such well-defined boundaries. Rather, a borderless aside may be visually separable or distinguishable from the main content by appropriate amount of vertical space and/or horizontal space between the main content and the borderless aside.

In one embodiment, the techniques are embodied in an aside detection system. In some such cases, the aside detection system includes a borderless aside detection module and/or a bordered aside detection module. Note that the bordered and borderless aside detection functionality may be integrated into a single module, or into two or more distinct aside detection modules. As will be explained in turn, the aside detection can be carried out in different ways, depending on whether there is a border or no border. Numerous embodiments will be apparent in light of this disclosure.

For example, in some embodiments, the aside detection module comprises a region identification module, an aside candidate identification module, and a content analysis and aside confirmation module. In some such embodiments, the region identification module parses various objects of the document, to identify a plurality of regions within the document. Merely as an example, a first region can be an aside, a second region can be a section of the main content, and so on.

In some such embodiments, the aside candidate identification module identifies probable candidate regions for asides from the plurality of regions, based on analyzing geometrical information associated with the regions, such as position of the regions relative to the page, position of the regions relative to other regions on the page, and/or size of the regions (e.g., height and/or width of region). So, regions which are not likely to be candidates for asides are eliminated or excluded from further consideration.

In more detail, and according to some embodiments, the aside candidate identification module identifies four different sections or panes of a page of the document—a top plane, a bottom plane, a left plane, and a right plane. In particular, the top pane of the page comprises a rectangular strip on top of the page, the bottom pane of the page comprises a rectangular strip on bottom of the page, the left pane of the page comprises a rectangular strip on left of the page, and the right pane of the page comprises a rectangular strip on right of the page. In some such embodiments, if a candidate region intersects with the top pane or the bottom pane, the aside candidate identification module determines that the candidate region is not likely to be an aside, and eliminates the candidate region from a list of aside candidate regions. On the other hand, if a candidate region lies completely within the left pane or the right pane, the aside candidate identification module determines that the candidate region is likely to be an aside candidate region, and keeps it in the list of aside candidate regions.

In another example embodiment, if two or more candidate regions within a page of the document are horizontally symmetrical, then the aside candidate identification module determines that the two or more regions are not aside candidate regions. Accordingly, the aside candidate identification module may eliminate the two or more candidate regions from the list of aside candidate regions.

In some embodiments, once the aside candidate identification module identifies a final list of aside candidate regions, the content analysis and aside confirmation module analyzes the content within each of the candidate regions, and confirms one or more of the candidate regions as asides. In more detail, the content analysis and aside confirmation module identifies styling attributes of content within each aside candidate region. For example, the content analysis and aside confirmation module considers styling attributes of the content (such as text) present in a candidate region and rest of the page, where the styling attributes include one or more of font type, text size, text color, text properties (e.g., bold, italic, or other properties), and/or any other appropriate styling attributes associated with the content. Based on such content analysis, the content analysis and aside confirmation module confirms one or more of the candidate regions as asides.

In one such example embodiment, the content analysis and aside confirmation module determines a dominant font style of the page, and a dominant font style of an aside candidate region. If the dominant font style of the candidate region is different from the dominant font style of the main content of the page, the content analysis and aside confirmation module identifies the candidate region as an aside. In another example such embodiment, the content analysis and aside confirmation module determines a correlation between the dominant font style of the candidate region with the dominant font style of the main content of the page. If the correlation is less than a threshold percentage, then the content analysis and aside confirmation module identifies the candidate region as an aside.

As discussed herein, the aside detection module can be programmed or otherwise configured to detect borderless asides and/or bordered asides. In one particular embodiment, a first aside detection module is programmed or otherwise configured to detect borderless asides and/or bordered asides, while a second aside detection module is configured to primarily detect bordered asides. Note that the second aside detection module may be used on its own, without the first aside detection module, in still other embodiments. In any such cases, and according to some embodiments, the second aside detection module comprises a container identification module, a container analysis module, and an aside identification module.

In more detail, containers within a document comprise one or more of graphic rectangles, graphic objects, and/or content bounded by borders formed by horizontal and vertical lines. Thus, a container may be a region within the document that has visually distinguishable characteristics, such as different a background color relative to the page, a bounding box forming a boundary, or the boundary of a graphic object. A bordered aside is an example of a container. In another example, at least some of a main section of the document (or a non-aside section of the document) may also be included in a container. In some such embodiments, the container identification module identifies one or more containers in the document, and generates a list of the identified containers. One or more containers in the list can possibly be asides, as will be appreciated.

In some embodiments, the container analysis module analyzes geometrical information associated with individual containers, such as geometrical position, shape, and/or size of individual containers within the list. In some embodiments, based on such analysis, the container analysis module selectively removes from the list one or more containers that are probably not asides. Subsequently, the container analysis module analyzes content within each individual containers in the list. In some embodiments, based on such analysis, the container analysis module further removes from the list one or more containers that are probably not asides. Finally, the aside identification module identifies the containers still remaining in the list as asides, such as bordered asides.

Once one or more bordered and/or borderless asides are identified (e.g., by the first aside detection module and/or second aside detection module), a content ordering module determines an order in which content is to be presented on a display screen, such as the relatively narrow display screen discussed herein earlier although any display screen can be used. Note that this display order takes into account the identified asides, such that the asides are timely presented for display of the document contents.

In an example, the actual ordering may vary from one embodiment to the next. For example, a user can configure the content ordering module to order the content, including the main content regions and the aside regions, in the order they are positioned in the document (e.g., in which case identification of asides may not alter the order of presentation). The order may presume, for instance, a top-to-bottom and left-to-right reading flow, which is typical in some countries. However, other countries may utilize different reading flows, such as top-to-bottom and right-to-left. In a more general sense, the content ordering module can be programmed or otherwise configured to utilize any desired reading flow to order the identified content sections of a given document. In another example, a user can configure the content ordering module to order the main content ahead of the asides. In another example, a user can configure the content ordering module to order the asides ahead of the main content.

In yet another example, the content ordering module may be configured such that a first segment of main content is ordered first, followed by asides associated with the first segment, followed by a second segment of main content, followed by asides associated with the second segment, and so on. In such an example, the asides are positioned in their respective logical orders, such that a user is not confused by sudden appearance of an aside in between portions of a single segment of content.

In some embodiments, once the display order is determined, a content presentation module causes presentation of the content on a display screen, such as the above discussed relatively narrow display screen, based on the determined reading or display order of the content. Numerous variations and embodiments will be appreciated in light of this disclosure.

System Architecture and Example Operation

FIG. 1 is a block diagram schematically illustrating selected components of an example computing device 100 (also referred to as device 100) configured to identify asides 115 within a document 113, and determine a display order 117 of contents within the document 113 based on the identified asides 115, in accordance with some embodiments. As can be seen, the device 100 includes an aside detection system 102 (also referred to as system 102) that allows the device 100 to identify asides within a document, and a content ordering module 170 that allows the device 100 to determine a display order of contents within the document based on the identified asides. As will be appreciated, the configuration of the device 100 may vary from one embodiment to the next. To this end, the discussion herein will focus more on aspects of the device 100 that are related to facilitating identification of asides and determination of a display order of contents of a document, and less so on standard componentry and functionality typical of computing devices.

The device 100 can comprise, for example, a desktop computer, a laptop computer, a workstation, an enterprise class server computer, a handheld computer, a tablet computer, a smartphone, a set-top box, a game controller, and/or any other computing device that can process a digital document to identify asides within the document. In some embodiments, the device 100 includes, or is communicatively coupled to, a display screen 142. Thus, in an example, the display screen 142 can be a part of the device 100, while in another example the display screen 142 can be external to the device 100. Accordingly, the display screen 142 is illustrated using dotted boundary in FIG. 1. In some embodiments, a width of the display screen 142 is relatively small, which is common for modern devices such as smart phones, tablets, notepads, and/or other mobile devices.

In an example, the document 113 may be originally authored as long-form document meant for viewing on a relatively large screen, such as a screen of a laptop or a desktop. The document 113 may be originally authored, merely as an example, for "A4" size viewing, where A4 size typically has dimensions of 8.27×11.69 inches. However, in an example, the width of the display screen 142 may be relatively smaller than a width of the A4 size. That is, the width of the display screen 142 may be relatively smaller than an original width for which the document 113 was originally generated. Thus, to more favorably view the document 113 on the display screen 142, contents of the document 113 can be re-ordered using the ordered display techniques provided herein.

Thus, while displaying the document 113 on the display screen 142, an aside 115 can be displayed vertically between two distinct regions or sections of the main content, at a beginning or an end of the main content, or embedded elsewhere within the main content. To facilitate such a purposeful display of content, the sections of the document 113 (e.g., including sections of the main content and the asides) can be ordered into a sequential reading or display order. Once so ordered, the sections of the document 113 may be presented for display according to this order. Note that sections or regions or segments are herein used interchangeably, and refer to distinct consumable pieces or chunks of a given document. According to some embodiments, an aside will not be displayed within a single such section, region, or segment, so as to break the reading flow (consumption) of that single section, region, or segment. Rather, in such cases, the aside can be placed, for example, above or below the single such section, region, or segment, according to some embodiments.

Further note that, in an example, although the document 113 includes asides 115, the document 113 may lack any tag or identifier that identifies a given region or segment of the document as an aside. Also, without any tag or identifier that identifies the asides 115, it may not be possible to present the document 113 on the small width display screen 142, with the asides visually separable from the main content and in the correct location relative to the main content. So, in some embodiments and as will be discussed in further detail, to order the contents of the document 113 correctly when displaying on display screen 142, the asides 115 are identified. Subsequently, the contents of the document 113 are ordered, taking into account the regions that have been identified as asides 115. Because the contents are now ordered, the asides 115 can now be placed in the correct logical position with respect to the main content. For example, the asides 115 may be placed at an end of a section of the main content, at an end of the main content, or at any other appropriate logical location with respect to the main content based on a given reading flow (e.g., top-to-bottom, left-to-right).

The document 113 can be of any appropriate format, such as PDF (Portable Document Format), HTML (Hypertext Markup Language), or another appropriate document format. The present disclosure is not intended to be limited to any particular format of document 113.

In the illustrated embodiment, the device 100 includes one or more software modules configured to implement certain functionalities disclosed herein, as well as hardware configured to enable such implementation. These hardware and software components include, among other things, a processor 132, memory 134, an operating system 136, input/output (I/O) components 138, a communication adaptor 140, data storage module 114, and the aside detection system 102. A document database 146 (e.g., that comprises a non-transitory computer memory) stores at least one or more documents for which asides can be detected and/or have been detected, and is coupled to the data storage module 114. A bus and/or interconnect 144 is also provided to allow for inter- and intra-device communications using, for example, communication adaptor 140. Note that in an example, components like the operating system 136 and the aside detection system 102 can be software modules that are stored in memory 134 and executable by the processor 132. In an example, at least some sections of the aside detection system 102 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually takes place over a physical bus structure or via software calls, request/response constructs, or any other such inter and intra component interface technologies, as will be appreciated.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also includes one or more I/O components 138, such as one or more of a tactile keyboard, a display, a mouse, a touch sensitive display, a touch-screen display, a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments, as will be appreciated.

Also illustrated in FIG. 1 is the aside detection system 102 implemented on the device 100. In the example embodiment shown, the system 102 includes a borderless and bordered aside detection module 104 (also referred to as module 104), and a borderless aside detection module 124 (also referred to as module 124). The modules 104, 124 are also generally referred to as aside detection modules 104, 124. Both are provided for purposes of robust disclosure, but other embodiments may include one or the other, as will be appreciated. In some example embodiments, the module 104 is programmed or otherwise configured to detect borderless asides (although the module 104 can detect bordered asides), and the module 124 is programmed or otherwise configured to primarily detect bordered asides. Note that in embodiments that include both modules 104 and 124, module 104 may include a first bordered aside detection methodology, and module 124 may include a second bordered aside detection methodology that is different from the first methodology.

In some embodiments, the modules 104 and/or 124 receive a document, such as the document 113, and identify asides 115 within the document 113. For example, the identified asides 115 may include one or more borderless asides detected by the module 104, and one or more bordered asides detected by one or both the modules 104, 124.

As can be seen in this example embodiment, the borderless and bordered aside detection module 104 comprises a region identification module 106, an aside candidate identification module 108, and a content analysis and aside confirmation module 110.

In some such embodiments, the region identification module 106 parses various objects of the document 113, to detect or otherwise identify a plurality of regions within the document 113. Merely as an example, a first region can be an aside, a second region can be a section of the main content, and so on.

In some embodiments, the aside candidate identification module 108 identifies probable candidate regions for asides from the plurality of regions, based on analyzing geometrical information such as position of the regions relative to the page, position of the regions relative to other regions on the page, and/or size of the regions, to name a few example geometrical relationships that can be used to identify possible aside regions. So, regions which are not likely to be candidates for asides are eliminated from further consideration.

In some embodiments, the content analysis and aside confirmation module 110 analyses the content within each of the candidate regions, and confirms one or more of the candidate regions as asides. For example, the content analysis and aside confirmation module 110 identifies styling attributes of content within each candidate region. For example, the content analysis and aside confirmation module 110 considers styling attributes of the content (such as text) present in a candidate region and rest of the page, where the styling attributes include one or more of font type, text size, text color, text properties (e.g., bold, italic, or other properties), and/or any other appropriate styling attributes associated with the content. Based on such content analysis, the content analysis and aside confirmation module 110 confirms one or more of the candidate regions as asides.

As can be further seen in this example embodiment, the bordered aside detection module 124 comprises a container identification module 126, a container analysis module 128, and an aside identification module 130. As previously explained, a bordered aside is an example of a container, whether the border be attributable to a bounding box, or the perimeter of a different color area, or some other boundary feature that acts a container for a bordered aside. In another example, at least some of a main section of the document (or a non-aside section of the document) may also be included in a container.

In some embodiments, the container identification module 126 identifies or detects one or more containers in the document, and generates a list of the identified containers. One or more containers in the list can possibly be asides. As previously discussed, containers comprise one or more of graphic rectangles, graphic objects, and/or content bounded by borders formed by horizontal and vertical lines.

In some embodiments, the container analysis module 128 analyzes geometrical information, such as geometrical position, shape, and/or size of individual containers within the list. In some embodiments, based on such analysis, the container analysis module 128 selectively removes from the list one or more containers that are probably not asides. Subsequently, the container analysis module 128 analyzes content within each individual container in the list. In some embodiments, based on such analysis, the container analysis module 128 further removes from the list one or more containers that are probably not asides. Finally, the aside identification module 130 identifies the containers still remaining in the list as asides, such as bordered asides.

Once one or more asides 115 are identified by the modules 104 and/or 124, the content ordering module 170 determines an order in which content is to be presented on the display screen 142, taking into account the identified asides. Thus, the order is a reading order or display order in which the content is to be displayed on the display screen 142, and possibly read or otherwise consumed by a user. Once one or more regions of the document 113 are ordered, the content presentation module 174 causes presentation of content on the display screen 142, based on the determined order of the content.

The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the aside detection system 102 may be implemented in any application that allows digital content processing and displaying.

Figure 2:
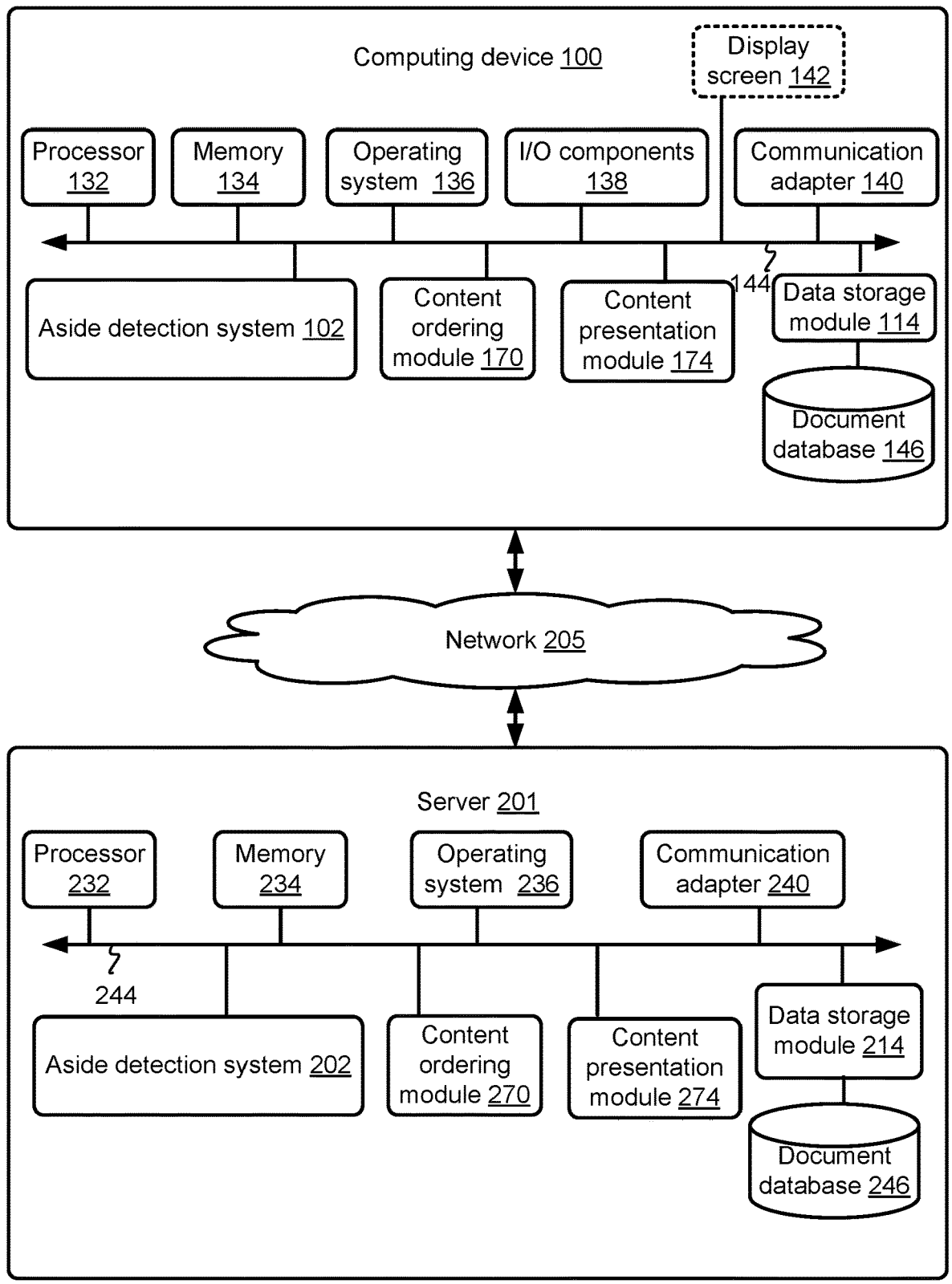
FIG. 2 is a block diagram schematically illustrating selected components of an example system comprising the computing device of FIG. 1 communicating with server device(s), where the combination of the computing device and the server device(s) is configured to identify asides within a document, and to determine a display order of contents within the document based on the identified asides, in accordance with some embodiments.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are collectively programmed or otherwise configured to identify asides within a document, determine a display order of content within the document based on the identified asides, and present that content for display in the determined order, in accordance with some embodiments.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide aside identification services and content ordering, as variously described herein. Examples of such services include receiving a document 113; identifying asides 115 within the document 113; ordering content based on the identified asides 115; and causing to display the ordered content on the display screen 142. As previously explained, the ordering can be based on a desired reading flow (e.g., top-to-bottom, left-to-right, or some other desired reading flow), or some other rule as will be appreciated in light of this disclosure. Although one server 201 implementation of the aside detection system is illustrated in FIG. 2, it will be appreciated that, in general, tens, hundreds, thousands, or more such servers can be used to manage an even larger number of aside detection and content ordering functions.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, an aside detection system 202 (also referred to as system 202), a content ordering module 270, a content presentation module 274, data storage module 214, and a communication adaptor 240. A document database 246 (e.g., that comprises a non-transitory computer memory) comprises multiple documents for which asides can be identified and/or have been identified, and is coupled to the data storage module 214. A bus and/or interconnect 244 is also provided to allow for inter- and intra-device communications using, for example, communication adaptor 240 and/or network 205. Note that components like the operating system 236 and aside detection system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including documents including asides. As shown, the server 201 includes the aside detection system 202 that communicates with the system 102 on the client device 100. In an example, the aside detection features discussed with respect to FIG. 1 can be implemented in FIG. 2 exclusively by the aside detection system 102, exclusively by the aside detection system 202, and/or may be shared between the aside detection systems 102 and 202. Thus, in an example, none, some, or all aside detection features are implemented by the aside detection system 202. Similarly, in an example, the content ordering features discussed with respect to FIG. 1 can be implemented in FIG. 2 exclusively by the content ordering system 170, exclusively by the content ordering system 270, and/or may be shared between the aside detection systems 170 and 270. Thus, in an example, none, some, or all the content ordering features are implemented by the content ordering system 170.

For example, when located in the server 201, the aside detection system 202 comprises an application running on the server 201 or a portion of a software application that can be downloaded to the device 100. For instance, the system 102 can include a web hosting application allowing the device 100 to interact with content from the system 202 hosted on the server 201. In this manner, the server 201 identifies asides within one or more documents and/or orders content within the documents, and transmits the ordered documents to the device 100 for presentation on the display screen 142.

Thus, the location of some functional modules in the system 200 may vary from one embodiment to the next. Any number of client-server configurations will be apparent in light of this disclosure. In still other embodiments, the techniques may be implemented entirely on a user computer, e.g., simply as stand-alone aside detection and content ordering application. Similarly, while the document database 146 is shown on the client side in this example case, it may be on the server side in other embodiments, such as the cloud-based document database 246. Thus, the document database can be local or remote to the device 102, so long as it is accessible by the aside detection system 102 that is implemented by the system 102 or implemented by the system 202, according to an embodiment.

Figure 3B:
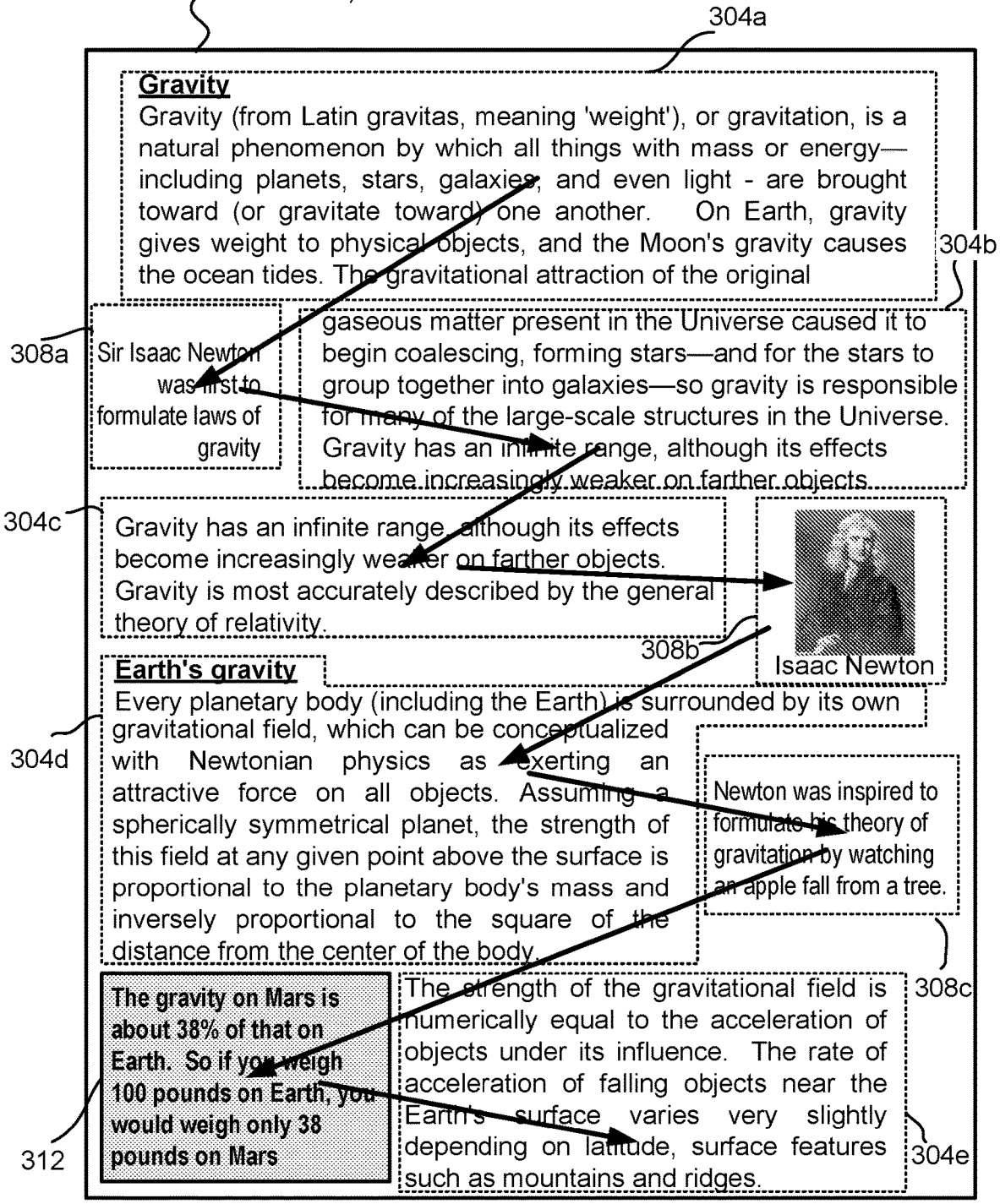
FIG. 3B illustrates an example ordering of content of the document of FIG. 3A for presentation, where the ordering is flawed because it is performed without taking into account identification of the asides in the document.

FIG. 3A illustrates an example document 300 including borderless asides 308a, 308b, 308c, and bordered aside 312, which may be detected by the borderless and bordered aside detection module 104 and bordered aside detection module 124 of FIGS. 1, 2, in accordance with some embodiments of this disclosure. The document 300 may be a digital document stored in any appropriate format, such as PDF, HTML, or another appropriate document format. In an example, the main portions of the document 300 are labelled as 304. Note that while FIGS. 3A-3E assume that the region 308b comprising an image is an aside, in some other examples, such a region may not be considered an aside—thus, whether the region 308b comprising the image is an aside or not may vary from one embodiment to the next.

As previously discussed herein, a borderless aside, such as any of the asides 308a, 308b, 308c, does not have any explicit border that clearly delineates or outlines the aside—rather, the aside is separated from the main content by placing the aside content separately from the main content, by having vertical and/or horizontal spacing between the aside and the main content, by having different font and/or background relative to the main content, and/or any other type of differentiator (e.g., visual differentiator) that differentiates the borderless aside from the main content. In contrast, a bordered aside, such as the aside 312, has a border or line outlining a boundary of the aside, and/or a different background. As previously discussed, the borderless and bordered aside detection module 104 is configured to detect the borderless asides and also possibly bordered asides, and the bordered aside detection system 124 is configured to detect the bordered asides.

In an example, the document 300 may be originally authored as long-form document meant for viewing on a relatively large screen, such as a screen of a laptop or a desktop. However, as discussed with respect to FIG. 1, in an example, the width of the display screen 142 may be relatively smaller than an original width with which the document 300 is intended to be viewed. Thus, to better view the document 300 on the display screen 142, the contents of the document 300 can be ordered, according to an embodiment.

FIG. 3B illustrates an example ordering of content for presentation on the display screen 142, where the ordering is performed without taking into account identification of the asides in the document 300. As can be seen, the resulting order is illustrated using arrows. This example is merely provided to demonstrate the problem of non-ideal reading order, and is not intended to limit the present disclosure, as will be appreciated. To this end, note that the ordering illustrated in FIG. 3B assumes that the aside detection modules 104, 124 are not present or otherwise operational, and the asides 308a, 308b, 308c, 312 have not been identified. Thus, the content ordering module 170 is unaware of the asides 308a-c and 312.

As can be further seen in FIG. 3B, various sections or regions of the document 300 are generally designated using dotted lines. As it is assumed that the aside detection modules 104, 124 are not present or otherwise operational, the content ordering module 170 does not know which of 304a, 304b, 304c, 304d, 304e, 308a, 308b, 308c, and 312 are main content, and which of these are asides. Accordingly, while ordering the content, the content ordering module 170 does not take into account identification of the asides. Rather, the content ordering module 170 merely orders the portions based on their relative positions on the document 300, e.g., from top-to-bottom, which in this example case leads to the following non-ideal reading order: 304a, 308a, 304b, 304c, 308b, 304d, 308c, 312, 304e. For example, if a beginning point of a first portion or section is above and/or to a left of that of a second portion or section, the first portion or section is ordered before the second portion or section, based on a top-to-bottom, left-to-right reading order. Thus, aside 308a is incorrectly ordered between main portions 304a, 304b, which will likely disrupt the reader's flow of the main content included in portions 304a, 304b.

FIG. 3C illustrates a display of the document 300 on the display screen 142, based on the ordering of FIG. 3B. As noted with respect to FIG. 3B, this example is merely provided to demonstrate the problem of non-ideal reading order. Referring to FIGS. 3B, 3C, as the ordering does not take into account identification of the asides, asides may be incorrectly displayed in between the main content (e.g., aside 308a is displayed inline with or otherwise between portions 304*a*, 304*b*, without visually differentiating the aside from the main content). Clearly, the uninformed placement of aside 308*a* in the reading order breaks the flow of portions 304*a*, 304*b*. Thus, a reader may be confused as to the relevance of the content within the aside 308*a*, as the content of the aside 308*a* is not presented as an aside in FIG. 3C.

Figure 3D:
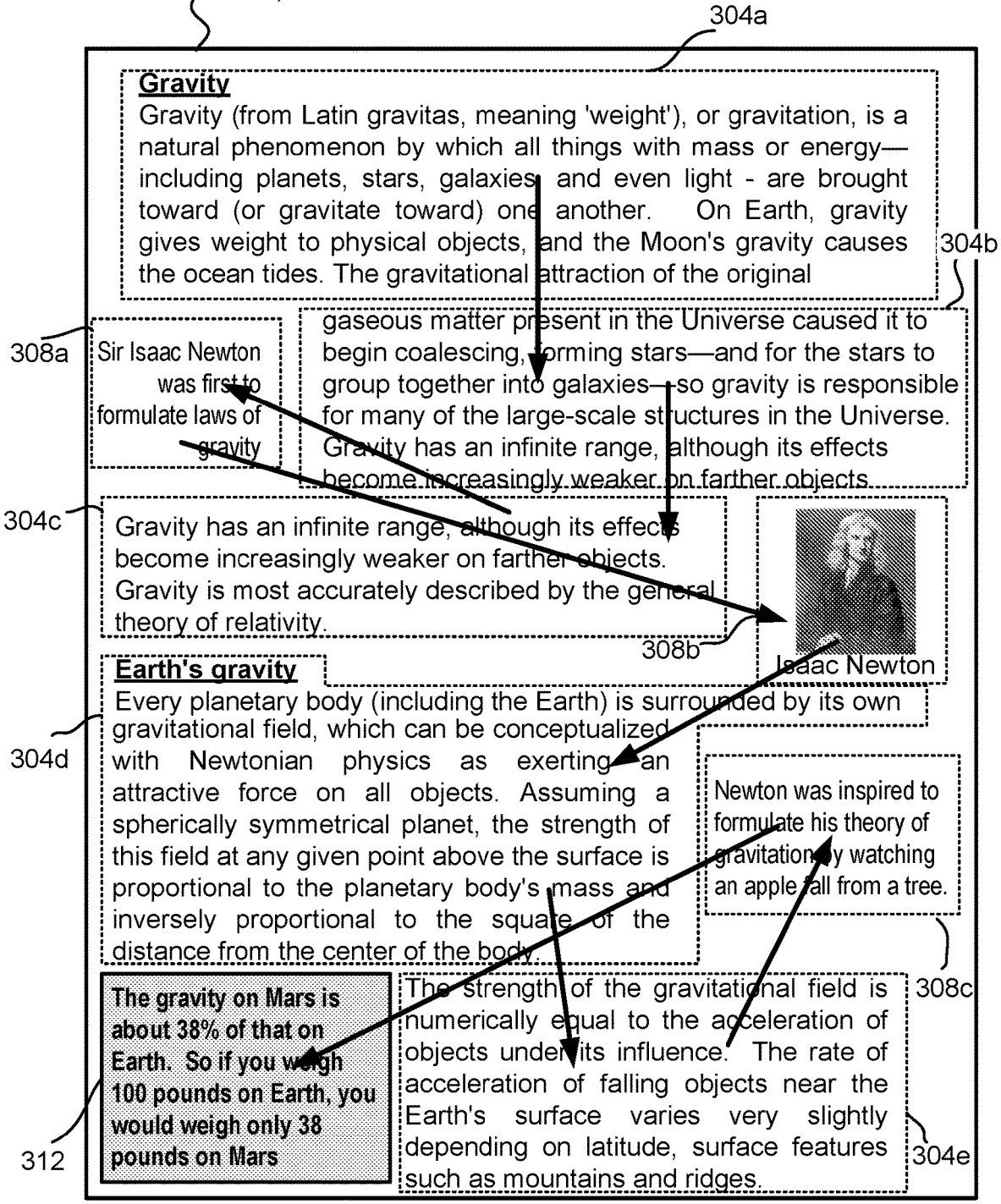
FIG. 3D illustrates an example ordering of content of the document of FIG. 3A for presentation, where the ordering is performed taking into account identification of the asides in the document, in accordance with some embodiments of this disclosure.

FIG. 3D illustrates an example ordering of content for presentation in the document 300 of FIG. 3A, where the ordering is performed taking into account identification of the asides in the document 300, in accordance with some embodiments of this disclosure. For example, the ordering illustrated in FIG. 3D assumes that the aside detection systems 104, 124 are operational, and the asides 308*a*, 308*b*, 308*c*, 312 have been identified by the aside detection systems 104, 124.

In more detail, the content ordering module 170 identifies each of 304*a*, 304*b*, 304*c*, 304*d*, 304*e*, 308*a*, 308*b*, 308*c*, and 312 of the document 300. In particular, the content ordering module 170 knows that 308*a*, 308*b*, 308*c* are borderless asides, 312 is a borderless aside, and 304*a*, 304*b*, 304*c*, 304*d*, 304*e* represent the main content of the document 300. Accordingly, while ordering the content, the content ordering module 170 takes into account identification of the asides.

The example ordering is again illustrated using arrows. For example, content ordering module 170 orders the content for display as follows: 304*a*, 304*b*, 304*c*, 308*a*, 308*b*, 304*d*, 304*e*, 308*c*, and 312. In this example, the content ordering module 170 determines that the main content has two segments or sections: a first segment or section "Gravity" comprising portions 304*a*, 304*b*, 304*c*, and a second segment or section "Earth's Gravity" comprising portions 304*d*, 304*e*. Accordingly, the content ordering module 170 initially orders portions 304*a*, 304*b*, 304*c* of the first segment or section, then the asides 308*a*, 308*b*, followed by portions 304*d*, 304*e* of the second segment or section, followed by the asides 308*c*, 312.

FIG. 3E illustrates a display of the document 300 on the display screen 142, based on the ordering of FIG. 3D, in accordance with some embodiments of this disclosure. Referring to FIGS. 3D, 3E, as the ordering does takes into account identification of the asides, asides in this example are displayed in between two segments or sections of the main content. Hence, a flow of consumption of a segment or section of the main content is not interrupted by the asides, as the asides are displayed at an end of the segment or section. This, in an example, results in a better satisfaction in consuming content, e.g., compared to that associated with the ordering and display of FIGS. 3B, 3C.

Furthermore, the asides 308*a*, 308*b*, 308*c* are better placed on the display screen 142, e.g., are visually distinguishable from the main content. Thus, a reader now can readily identify contents of the sections 308*a*, 308*b*, 308*c* as being asides, and can clearly separate the asides 308*a*, 308*b*, 308*c* from the main content. Further note that in this embodiment, a segment or section may include one or more portions intended to be read as one continuous flow, and does not include an aside.

Further note that the actual ordering in FIG. 3D is merely an example, and other ordering may be implemented by the content ordering module 170. For example, the actual ordering implemented by the content ordering module 170 may vary from one embodiment to the next, as long as such ordering takes into account identification of the asides (e.g., as identified by the aside detection system 102).

For example, the actual ordering of content is based on a user preference. Merely as an example, a user can configure the content ordering module 170 such that asides are displayed at an end of a segment or section (e.g., as discussed with respect to FIGS. 3D, 3E). In another example, a user can configure the content ordering module 170 such that asides are displayed at an end of the main content. In yet another example, a user can configure the content ordering module 170 such that asides are displayed in between content, e.g., in the order they are occur in the document 300. Thus, any appropriate content ordering scheme can be used, as long as such schemes take into account identification of the asides, as determined by the aside detection system 102.

Numerous figures of this disclosure (such as FIGS. 3B, 3D, and various subsequent figures) illustrate example documents, with dotted lines showing boundary of corresponding regions, objects, or containers. It is noted that the dotted lines are not a part of the document itself, and are added for illustration of the boundary, as will be appreciated.

Figure 4A:
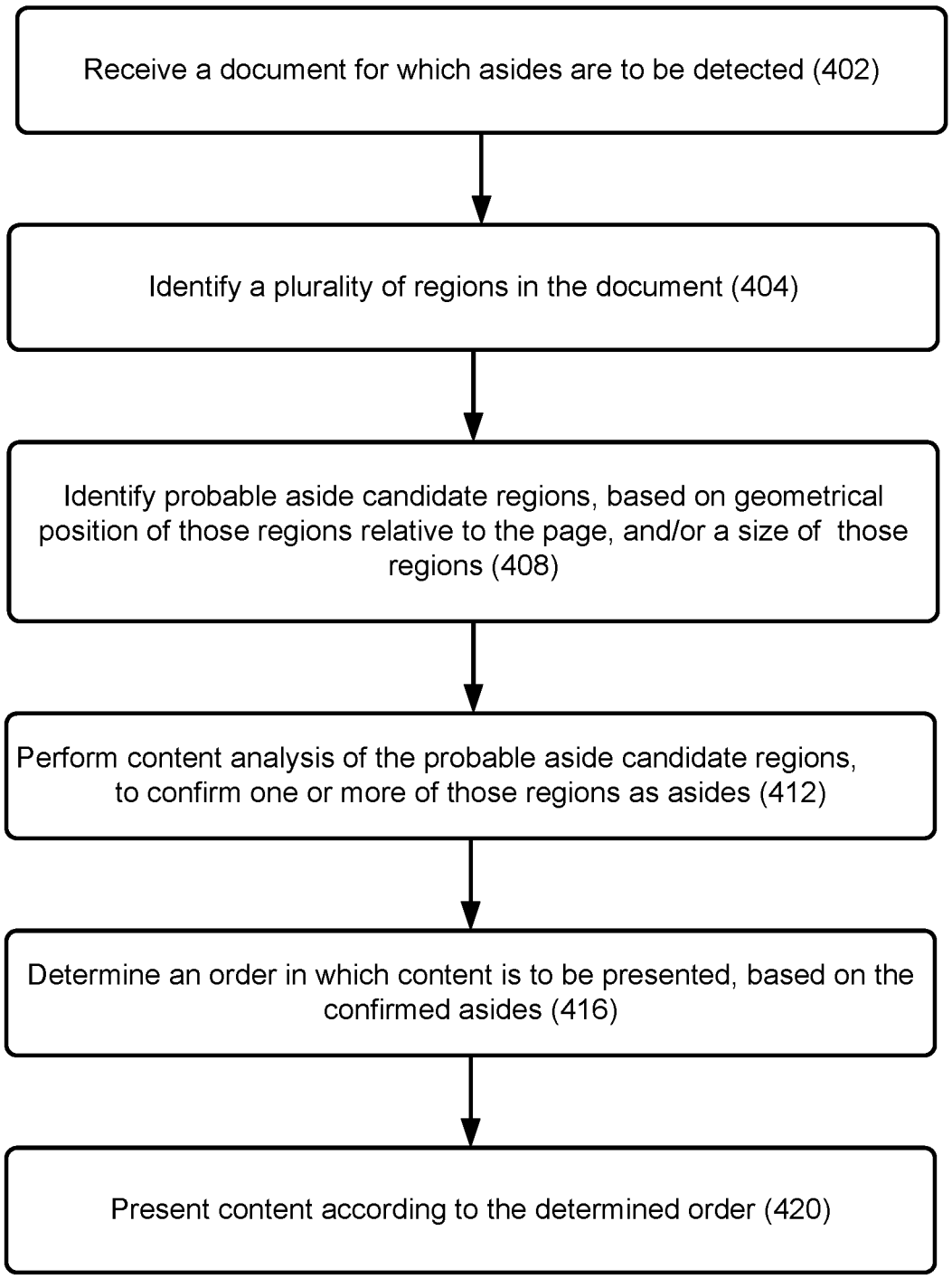
FIG. 4A is a flowchart illustrating an example method for detecting asides in a document, in accordance with some embodiments of the present disclosure.

FIG. 4A is a flowchart illustrating an example method 400 for detecting asides in a document, in accordance with some embodiments of the present disclosure. Method 400 can be implemented, for example, using the system architecture illustrated in FIGS. 1 and/or 2, such as the aside detection module 104. However other system architectures can be used in other embodiments, as apparent in light of this disclosure. To this end, the correlation of the various functions shown in FIG. 4A to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may facilitate detection of asides, and a second server may provide the content ordering functionality. In yet another embodiment, a client device (such as device 100, instead of a server) may identify the asides and/or may provide also functionality associated with content ordering. Thus, although various operations of the method 400 are discussed herein as being performed by the system 102 of the computing device 100, one or more of these operations can also be performed by the system 202 of the server 201 as well.

In some embodiments, the method 400 can be used to detect borderless asides, although in some other embodiments the method 400 can be used to detect bordered asides as well. Some of the examples discussed with respect to the method 400 applies to borderless asides, although teachings of such examples can be extended for detection of bordered asides as well.

Furthermore, FIGS. 5A-5L illustrate various examples documents that are discussed with respect to the method 400 of FIG. 4A, in accordance with some embodiments of the present disclosure. Thus, FIGS. 4A and 5A-5L will be discussed in unison.

At 402 of the method 400, a document, is received. In an example, asides are to be detected for the document. The received document may be the document 113 discussed with respect to FIG. 1, any of the documents discussed with respect to FIGS. 5A-5L, and/or any other documents discussed herein.

At 404 of the method 400, one or more regions in the document are detected or otherwise identified, where at least one or more of the identified regions can possibly be asides.

In some embodiments, the region identification module 106 identifies the regions at 404. For example, the region identification module 106 groups the document into a plurality of regions, thereby identifying the regions.

Figure 5A:
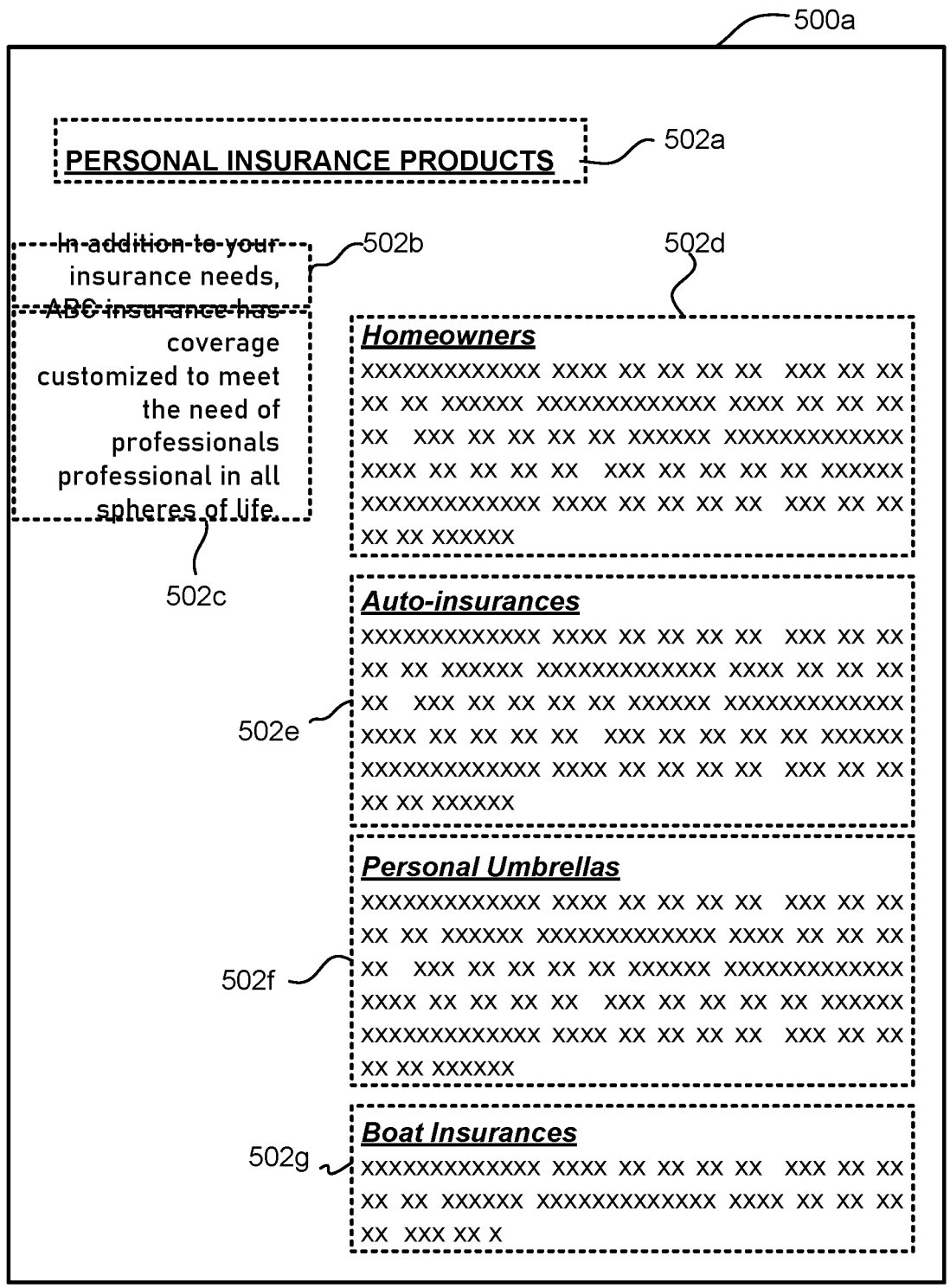

For example, as discussed with respect to FIGS. 1 and 2, the aside detection system 102 receives the document for which asides are to be identified. In some embodiments, to identify the regions, the region identification module 106 takes as input an array of different objects present on a page of the document. For example, FIG. 5A illustrates a document 500a, where the region identification module 106 identifies various objects 502a, . . . , 502g within the document. In an example, an object in a document is a section of the document that has some visually differentiating factors from one or more adjoining sections. The visually differentiating factors can include one or more of different fonts, different color, different background, different layouts, different positions, being in a cluster of content that is separate from adjoining clusters of content, separated from an adjacent object by vertical and/or horizontal space, and/or any other appropriate visually differentiating factors. In another example, individual objects are tagged in the documents. For example, the document includes a plurality of tags or identifiers, each tag identifying a corresponding object.

In an example, the region identification module 106 takes into account one or more factors (e.g., a combination of multiple factors) when identifying a region. For example, the region identification module 106 analyzes geometrical positions of the objects, to possibly merge one or more objects in a region. In an example, along with (or instead of) geometrical positions, the region identification module 106 also considers styling of contents, in combination with area of the regions to be merged, before merging the objects in a region.

FIG. 4B is a flowchart illustrating an example methodology for identifying one or more of regions in a document, in accordance with some embodiments of the present disclosure. Thus, the methodology of FIG. 4B explains the operations at 404 of the method 400 of FIG. 4A in further detail, according to an embodiment. Method 404 can be implemented, for example, using the region identification module 106 illustrated in FIGS. 1 and/or 2, and described herein.

Referring now to FIG. 4B, at 404a, the region identification module 106 identifies various objects in a document, as discussed with respect to FIG. 4A. In an example, objects may be identified and ordered in the order of their appearance in the page. For example, FIG. 5A illustrates various example objects in the document 500a.

At 404b, the region identification module 106 identifies, for each object, corresponding object information. In an example, object information of an object includes positioning information of a bounding box of the object (e.g., relative to other neighboring objects), styling attributes, and/or any other relevant information.

For example, positioning information of an object includes position information of a bounding box or boundary of the object (e.g., left boundary, right boundary, top boundary, and/or bottom boundary). For example, FIG. 5A illustrates the boundaries of various objects 502. In some embodiments, positioning information of a first object includes distance between (i) a top boundary of the first object and (ii) a bottom boundary of a second object that is immediately above the first object. Similarly, positioning information of the first object includes distance between (i) a right boundary of the first object and (ii) a left boundary of a third object that is immediately right of the first object. Thus, vertical and/or horizontal distances between boundaries of various objects are considered. For example, in FIG. 5A, it is seen that a vertical distance between the objects 502d, 502e is relatively less, a vertical distance between the objects 502e, 502f is relatively less, a vertical distance between the objects 502b, 502c is relatively less, but a vertical distance between the objects 502a, 502b is relatively more, and so on.

The object information of an object also includes, in an example, styling attributes associated with the object. Styling attributes includes, for example, font type (e.g., whether "Arial" font, "Times New Roman font," or another style of font), font size, font effects (e.g., whether bold, capitalized, italicized, underlined, etc.), font color, background color, whether a section of object is a header or has style of a header, whether a section of the object is a bulleted list, whether a section of the object has a figure, and/or any other appropriate stylistic information associated with the content within the object.

Figure 5B:
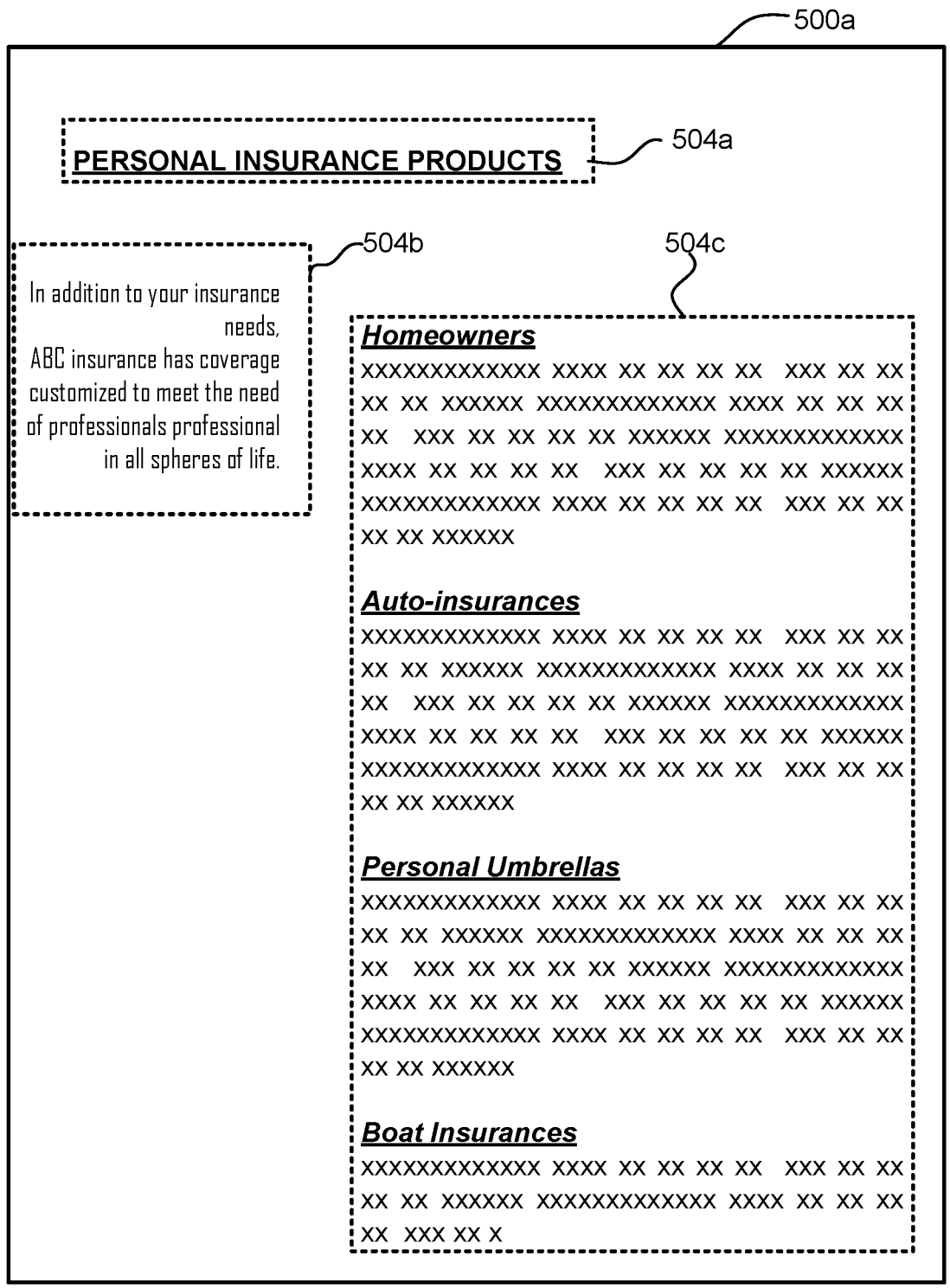
Figure 5C:
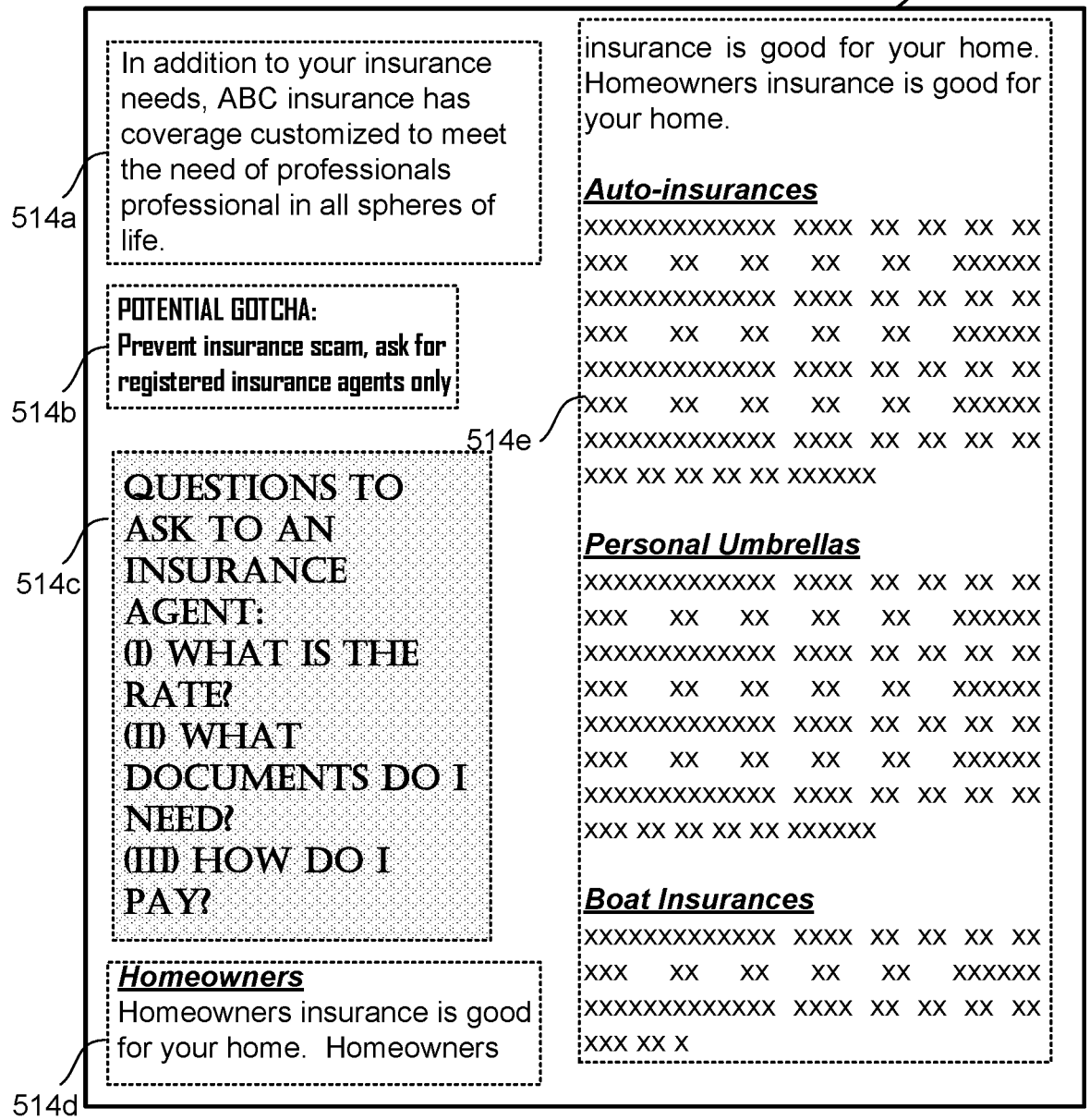

At 404c, if appropriate, two or more objects are merged into a corresponding region. Thus, the plurality of regions is effectively identified (e.g., as discussed with respect to 404 of the method 400 of FIG. 4A), each region including a corresponding one or more objects. It may be noted that in one example, a region may include merely one object that cannot be merged with another object. In another example, a region may include two or more objects that are merged to form the region. For example, FIG. 5B illustrates the document 500a of FIG. 5A, with regions 504a, 504b, 504c generated by the region identification module 106. For example, objects 502b, 502c of FIG. 5A are merged to generate the region 504b; objects 502d, . . . , 502g of FIG. 5A are merged to generate the region 504c; and the region 504a comprises the single object 502a of FIG. 5A. FIG. 5C illustrates another document 500c, in which content is divided in multiple regions 514a, . . . , 514e, in accordance with an embodiment of the present disclosure.

FIG. 4C illustrates an example methodology for generating regions within a document, by opportunistically merging two or more objects within the document, as discussed with respect to operations 404c of method 404 of FIG. 4B, in accordance with an embodiment of the present disclosure.

In some embodiments, for a first object and a second object to be merged to form a region, the second object has to be below an initial region comprising the first object (e.g., condition (i) of methodology 404c). For example, in FIG. 5A, object 502c is below the object 502b, and hence, can potentially be merged. However, as object 502c is not below object 502d, these cannot be merged. Furthermore, object 502b is below the object 502a, and hence, can potentially be merged. Similarly, the stack of objects 502d, . . . , 502g satisfy this condition, and hence, can potentially be merged. This, condition (i) ensures that only vertically stacked objects can be merged into a region.

Condition (ii) of FIG. 4C states that a current object under consideration can be merged to a region, if the current object and the region have some common overlap of horizontal span (e.g., by a factor of minimum of the widths of the two). As seen, objects 502b, 502c satisfy this condition, and hence, can potentially be merged. Similarly, the stack of objects 502d, . . . , 502g satisfy this condition, and hence, can potentially be merged.

Condition (iii) specifies that a vertical gap between two objects should be under a pre-defined threshold for the two objects to be merged. For example, in FIG. 5A, objects 502b, 502c satisfy this condition. Similarly, the stack of objects 502d, . . . , 502g satisfy this condition, and hence, can potentially be merged. However, objects 502a, 502b do not satisfy this condition, and hence, cannot be merged. Thus, a region is separated from a neighboring region by at least the pre-defined threshold vertical gap.

Condition (iv) specifies that if both objects are of significant height (e.g., higher than a threshold height), their styling has to be similar (within given thresholds). This is to ensure that two objects that are close, where one of them is an aside, do not get merged in one region. For example, asides generally have different styling compared to the main content, and condition (iv) ensures that an aside is not merged with the main content. For example, in FIG. 5A, each of objects 502d, . . . , 502g has a heading followed by text, where the headings of the objects have similar style and the text of the objects also have similar style. Thus, the objects 502d, . . . , 502g have similar styling, and hence, can potentially be merged. On the other hand, in FIG. 5C, the regions 514b, 514c have different styling (e.g., different font, different background), and hence, are not merged into a common region. Similarly, in FIG. 5C, the regions 514a, 514b are not merged. The significant height condition ensures that cases like headings with paragraphs are merged.

Thus, if two objects are close enough and both are significant regions on their own and have different styling, then the two objects are not merged, as one or both of those could be asides. Accordingly, in FIG. 5C, the regions 514b, 514c are not merged. Similarly, in FIG. 5C, the regions 514a, 514b are not merged.

Condition (A) of FIG. 4C checks all the conditions (i), . . . , (iv), and merges objects to form a region if one or more (for example, all) the conditions (i), . . . , (iv) are satisfied.

As discussed in condition (B) of FIG. 4C, the objects have an order in which they appear in the document. For example, referring to FIG. 3B, after the portion 304a, the aside 308a appears in the order, followed by portion 304b. Accordingly, the content can be presented in that order in an example. Thus, although portion 304b is not present in a continuous order after portion 304a, sections 304a, 304b satisfy the conditions (i), . . . , (iv), and can be merged in a same group to form a section or segment.

Condition (C) specifies that if none of conditions (A) and (B) are satisfied, the object cannot be merged with another object, and hence, a new region comprising the single object is created.

Referring again to FIG. 4A, the method 400 proceeds from 404 to 408, where the aside candidate identification module 108 identifies one or more of the regions detected at 404 as probable candidates for asides. In some embodiments, the identification at 408 is based on geometrical position of the regions relative to the page, position of the regions relative to other regions on the page, and/or size of the regions. As will be appreciated, assuming that every region that has different styling than that of the main content is an aside candidate may not be optimal, and can possibly lead to false identification of a region as an aside. So, the operation at 408 eliminates candidate aside regions that do not meet certain criteria. FIG. 4D illustrates an example methodology for identifying candidates for asides, as discussed in operation 408 of the method 400. In the example embodiment shown in FIG. 4D, the methodology for carrying out operation 408 uses geometrical position of a region, including the width, height and overall area captured by the region, to predict if the region is a probable candidate for aside.

Figure 5D:
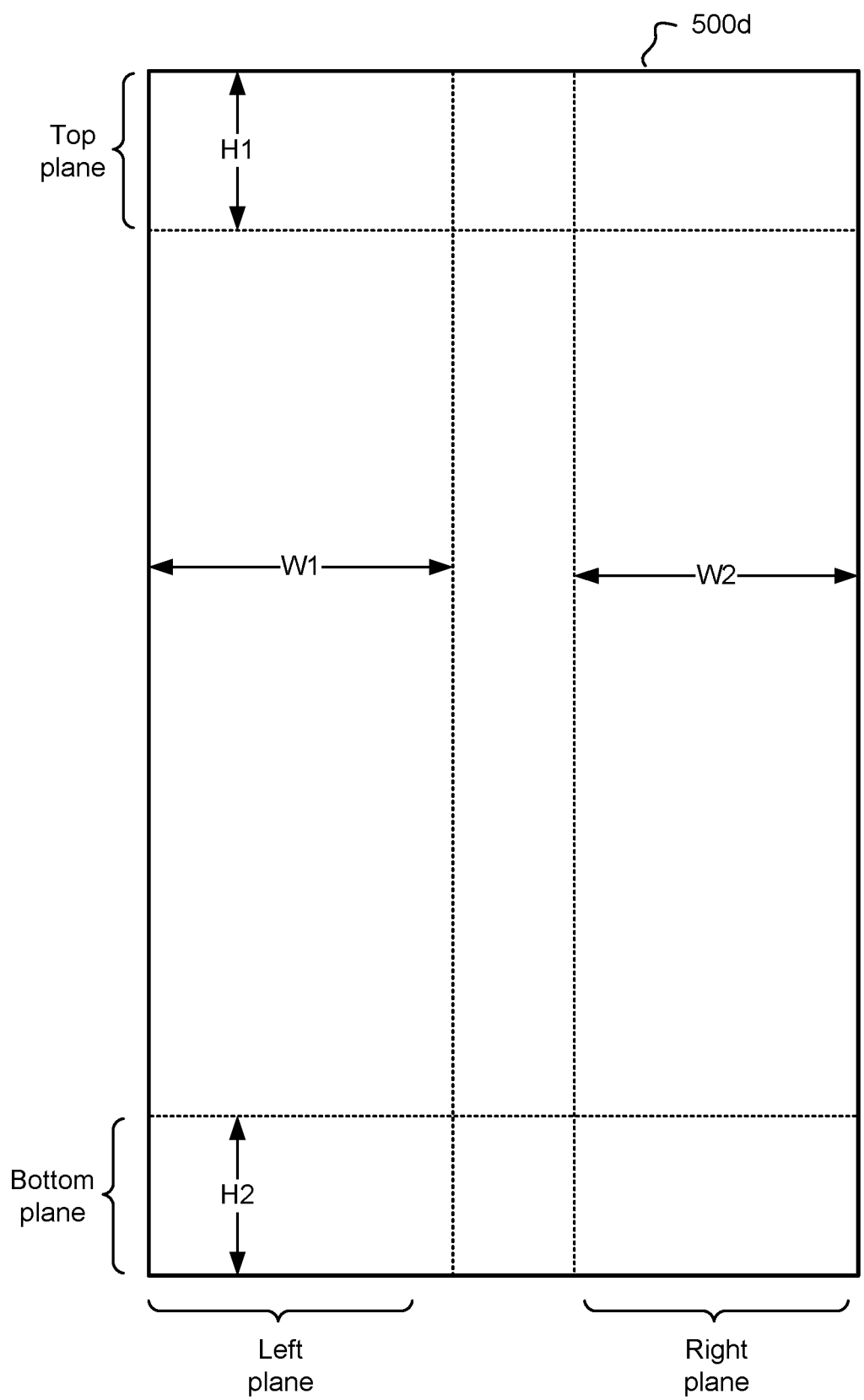

In more detail, and with reference now to the example embodiment of FIG. 4D, four different sections or panes of a page of the document are identified—a top plane, a bottom plane, a left plane, and a right plane. FIG. 5D illustrates four different panes of a page 500d, in accordance with an embodiment of the present disclosure. Referring to FIGS. 4D and 5D, for example, the top section or top pane of the page comprises a rectangular strip on top of the page, with a height of H1% of the page. In an example, the bottom section or bottom pane of the page comprises a rectangular strip on bottom of the page, with a height of H2% of the page. In an example, the left section or left pane of the page comprises a rectangular strip on left of the page, with a width of W1% of the page. In an example, the right section or right pane of the page comprises a rectangular strip on right of the page, with a width of W2% of the page.

For example, in one such embodiment, the height H1 is about 15% of the page, and may range from 10-20%. In addition, the height H2 is about 15% of the page, and may range from 10-20%. In addition, the width W1 is about 45% of the page, and may range from 35-48%. In addition, the width W2 is about 45% of the page, and may range from 35-48%. These example percentages are empirically selected by analyzing a large number of documents, some of which includes asides. These percentages may vary from one embodiment to the next, as will be appreciated in light of this disclosure.

FIGS. 5E, 5F, 5G, 5H, 5I illustrate example documents 500e, 500f, 500g, 500h, 500i, respectively, where the documents 500e, . . . , 500i provide examples of probable candidate aside regions, in accordance with another embodiment of the present disclosure. Referring now to FIG. 4D, condition (A) of the methodology 408 specifies that if a region intersects with the top pane (i.e., is at least in part within the top pane), the region is not likely to be an aside candidate. Hence, the region is not identified as a candidate region for asides at 408. Accordingly, heading and/or header regions of a page are not identified as an aside. For example, referring to FIG. 5E, the title of the paper ("Computer Architecture For Better Detection of Asides in Documents") and the name of the journal ("ABC Journal on Computer, vol. A, December 2019") are eliminated from being probable candidates for asides.

Further referring to FIG. 4D, condition (B) of the methodology 408 specifies that if a region intersects with the bottom pane (i.e., is at least in part within the top pane), the region is not likely to be an aside candidate. Hence, the region is not identified as a candidate region for asides at 408. Thus, footer and/or footnotes of a page is not identified as an aside. For example, referring to FIG. 5E, the footnotes of the paper ("Manuscript received . . . ", and "0018-9344 . . . ") are eliminated from being probable candidates for asides.

Further referring to FIG. 4D, condition (C) of the methodology 408 specifies that if a region completely lies in either the left pane or the right pane (i.e., if the region is fully contained within the left or right pane), then the region is identified as a candidate region for asides. For example, in a two-column page, such as the document 500e of FIG. 5E, the left column is unlikely to completely or fully lie in the left pane, and the right column is similarly unlikely to completely or fully lie in the right pane. Accordingly, the two columns comprising the main content (e.g., the abstract, introduction, and background sections of the document 500e) are not identified as candidate region for asides. On the other hand, the region 504b of the document 500a of FIG. 5B is likely to be completely within the left pane, and hence, is a probable candidate for aside. However, the region 504c is not completely within the right pane, and hence, is not a probable candidate for aside. For similar reasons, regions 514*a*, 514*d*, 514*e* of the document 500*c* of FIG. 5C are not probable candidates for asides, but regions 514*b*, 514*c* are probable candidates for asides.

Figure 5F:
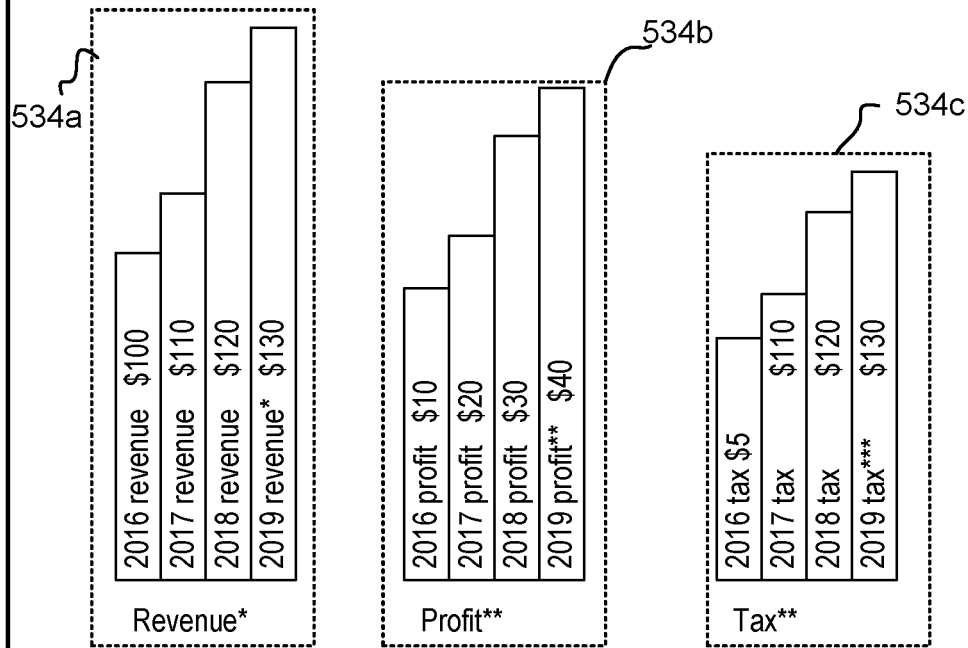

Referring to FIGS. 5F, 5G, the regions 534*a*, 534*c*, 544*a*, 544*c* satisfy the above discussed conditions A, B, and C of the methodology 408 (e.g., assuming that the regions 544*a*, 544*c* are not within the top pane), but are not asides. For example, these regions have properties of asides, e.g., these regions are separate from the other content on page, have different style of text, and/or contains graphics. However, in the context of the content of corresponding documents, these regions are not asides. These regions have one thing in common, which is horizontal symmetry. Accordingly, the condition (D) of the methodology 408 of FIG. 4D analyzes identified aside candidate regions (or original regions from operations 404) to find horizontally symmetrical regions, and such horizontally symmetrical regions are removed from being aside candidates. Thus, based on the condition (D), the regions 534*a*, 534*c*, 544*a*, 544*c* are not probable candidates for asides. Put differently, in some embodiments, if two or more regions have horizontal symmetry, those regions are ruled out from being asides.

In some embodiments, condition (E) of the methodology 408 of FIG. 4D identifies regions with height and/or width less than corresponding height threshold and/or width threshold, and removes such regions from the list of candidate aside regions. Thus, a single line of content (e.g., a heading), a page number, and/or region occupying relatively small area are not identified as probable aside candidate.

As discussed, the methodology 408 uses geometrical position of a region, width, height and overall area captured by the region to predict if the region is a probable candidate for aside. There may be some false positive outcome of the methodology 408. For example, referring to FIG. 5H, both regions 554*a*, 554*b* are likely to be identified as probable candidates for asides by the methodology 408—however, region 554*a* is a part of the main content, while region 554*b* is an aside. Similarly, in another example, referring to FIG. 5I, regions 564*a*, 564*b*, 564*c* are likely to be identified as probable candidates for asides by the methodology 408—however, region 564*c* is a part of the main content, while regions 564*a*, 564*b* are asides. As will be discussed in further detail below, such false positive candidate asides can be eliminated or otherwise reduced in operations 412 of the method 400.

Referring again to the method 400 FIG. 4A, the method 400 proceeds from 408 to 412, where the content analysis and aside confirmation module 110 confirms one or more asides from the candidate regions identified at 408. In some embodiments, the module 110 performs content analysis of the candidate regions, to confirm one or more of the candidate regions as asides. In an example, analysis of content of the candidate regions includes gathering styling attributes of content within each candidate region. FIG. 4E illustrates an example methodology for analyzing contents of candidate regions, to confirm one or more of the candidate regions as asides, in accordance with an embodiment of the present disclosure. Thus, the methodology provides an example implementation of operations 412 of the method 400.

In some embodiments, the module 110 performs content analysis of the candidate regions by comparing content within the candidate regions with content on rest of the page. If there is enough difference between a candidate region and rest of the page, the module 110 marks the candidate region as an aside.

In some embodiments, the module 110 considers one or more factors when comparing content within the candidate regions with content on rest of the page. For example, the module 110 considers one or more styling attributes of the content (such as text) present in the candidate region and rest of the page, where the styling attributes includes one or more of font type, text size, text color, text properties (e.g., bold, italic, or other properties), and/or any other appropriate styling attributes associated with the text.

For example, referring to the methodology 412 of FIG. 4E, at 437, the module 110 determines a dominant font style of the page. For example, the module collects font style of individual lines of the page, and the dominant font style is a font style that occurs in a maximum number of lines in the page. As discussed, the font style may represent one or more of font type (e.g., whether the font type is "Times New Roman" or "Arial"), text size (e.g., whether the font is size 10 or size 12), text color, text properties (e.g., bold, italic, or other properties), and/or any other appropriate styling attributes. At 441 of the methodology 412, the module 110 similarly determines a dominant font style of an aside candidate region. At 443, if the module 110 determines that the dominant font style of the candidate region is different from the dominant font style of the page, the module 110 confirms the candidate region as an aside.

In some embodiments, if the dominant font style of the candidate region is same as the dominant font style of the page, then the module 110 checks for correlation between the dominant font style of the candidate region with the dominant font style of the page. For example, a dot-product between the dominant font style of the candidate region and the dominant font style of the page is calculated, to determine the correlation between the dominant font style of the candidate region with the dominant font style of the page. In the methodology 412, 445 discusses an example determination of a correlation between the dominant font style of the candidate region with the dominant font style of the page.

Merely as an example, to determine the correlation, assume that the content of the page has a font type of "Arial" and "Calibri." In 445 of the methodology 412, a fontCount is made to count a number of words (or a number of letters or lines) that have the Arial font type. Similar fontCount determination is made for the candidate region. Thus, two values are determined for the Arial font type: (i) fontCount_Arial_page and (ii) fontCount_Arial_region. Similarly, two values are determined for the Calibri font type: (i) fontCount_Calibri_page and (ii) fontCount_Arial_region. If there are other font types (such as "Times New Roman" or any other appropriate font types), similar values are determined for each font type.

Continuing with the above example, a first correlation between fontCount_Arial_page and fontCount_Arial_region is determined. Similarly, a second correlation between fontCount_Calibri_page and fontCount_Calibri_region is determined. Similarly, a correlation between such two values for other font types, if present, are also determined. Finally, an overall correlation, which is based on the first correlation, the second correlation, etc., is determined. If the font styles of the candidate region are relatively similar to the font styles of the page, then the correlation would be high. On the other hand, if the font styles of the candidate region are relatively different from the font styles of the page, then the correlation would be low. Note that 445 of the methodology 412 illustrates merely an example determination of the correlation, and any appropriate variation of 445 of the methodology 412 is also possible. Furthermore, note that in the above example, font styles of a page are discussed. However, a document can include multiple pages, and font styles of the document, instead of (or in addition to) the font style of the page, can be used.

If the final correlation is greater than a threshold percentage (e.g., 20% in methodology 412), then the candidate region is not considered as an aside. However, if the final correlation is less than the threshold percentage, then the candidate region is confirmed as an aside, as illustrated in 447 of the methodology 412.

For example, the region 504b of the document 500a of FIG. 5B is confirmed as an aside, as this region has a dominant font style that is different from the dominant font style of the page, and a correlation between the font styles of the page and the font style of the region is sufficiently low. For similar reasons, regions 514b, 514c of the document 500c of FIG. 5C are confirmed as asides. Similarly, region 554b of document 500h of FIG. 5H is confirmed as an aside, while region 554a is not confirmed as an aside. Similarly, regions 564a, 564b of document 500i of FIG. 5I are confirmed as asides, while region 554c is not confirmed as an aside.

In some embodiments, the aside identification module 110 considers one or more other factors, such as presence of graphic elements (e.g., figures, path elements, tables, or another appropriate graphical element), to determine or otherwise confirm whether a candidate region is an aside, as discussed with respect to 439 of the methodology 412. For example, if the candidate region only has one or more figures and associated one or more captions (or only one or more figures, without caption), the candidate region is not confirmed as an aside. In another example, if the candidate region merely has a table, the candidate region is not confirmed as an aside. In another example, if the candidate region is a header or a footer (or includes footnotes), the candidate region is not confirmed as an aside.

In some embodiments, the module 110 can also check as to whether bounds of the content of a candidate region lies within bounds of the candidate region, as seen in 438 of the methodology 412. If so, then the methodology 412 proceeds to selectively keep or remove a candidate region as aside, as discussed with respect to 439 of the methodology 412.

If a candidate region is confirmed as an aside, the module 110 associates or assigns an aside tag to the candidate region, as seen in 449 of the methodology 412. The tag is a flag or an indicator that confirms that the candidate region is an aside.

Referring again to the method 400 of FIG. 4A, once one or more asides are confirmed, the method 400 proceeds from 412 to 416, where the content ordering module 170 determines an order in which content is to be presented, based on the confirmed asides. The order is a reading order or display order in which the content is to be displayed on the display screen 142, and possibly read by a user.

The ordering can vary from one embodiment to the next. For example, a user can configure the content ordering module 170 to order the content, including the main content region and the aside region, in the order they are positioned in the document (e.g., in which case identification of asides may not alter the order of presentation). In another example, a user can configure the content ordering module 170 to order the main content ahead of the asides.

Figure 5J:
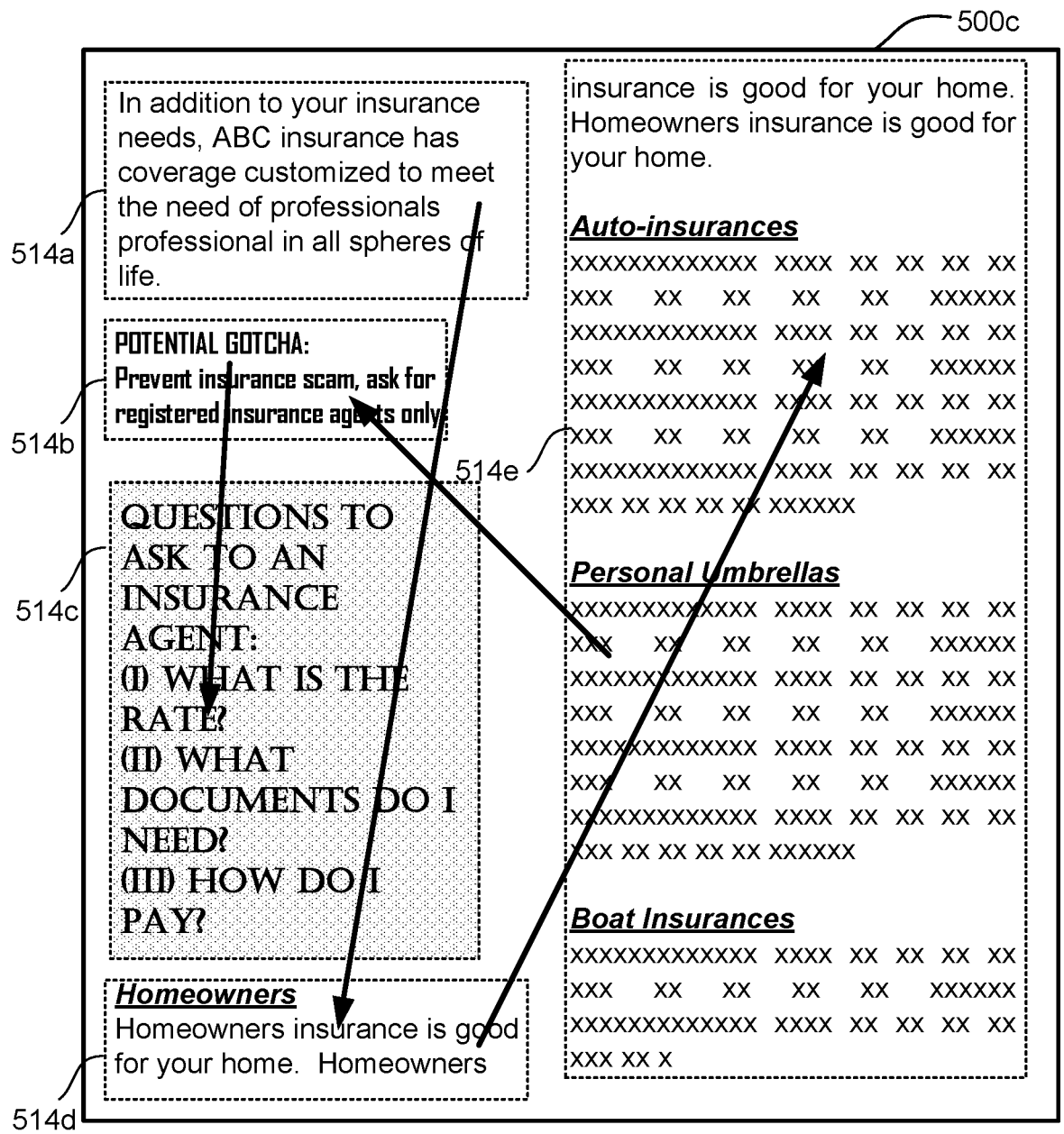

For example, FIG. 5J illustrates ordering of regions in the document 500c of FIG. 5C, based on confirmation of the aside regions 514b, 514c, in accordance with an embodiment of the present disclosure. In the example of FIG. 5J, the content ordering module 170 orders the main content ahead of the asides. Thus, main content comprising regions 514a, 514d, 514e are ordered, followed by aside regions 514b, 514c.

Figure 5K:
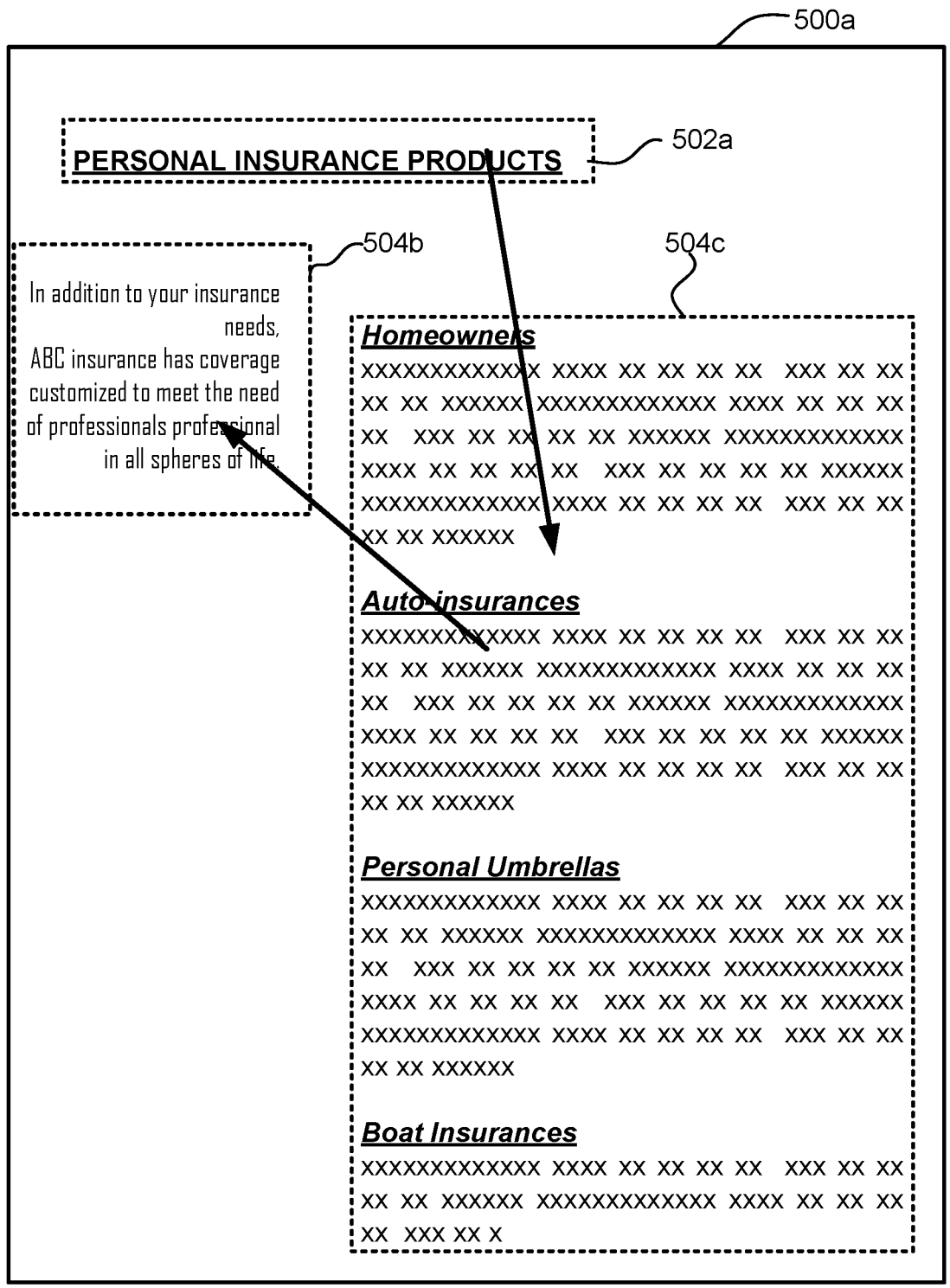

In another example, FIG. 5K illustrates ordering of regions in the document 500a of FIGS. 5A-5B, based on confirmation of the aside region 504b, in accordance with an embodiment of the present disclosure. In the example of FIG. 5K, the content ordering module 170 orders the main content ahead of the asides. Thus, main content comprising regions 502a, 504c are first ordered, followed by the aside region 504b.

Figure 5L:
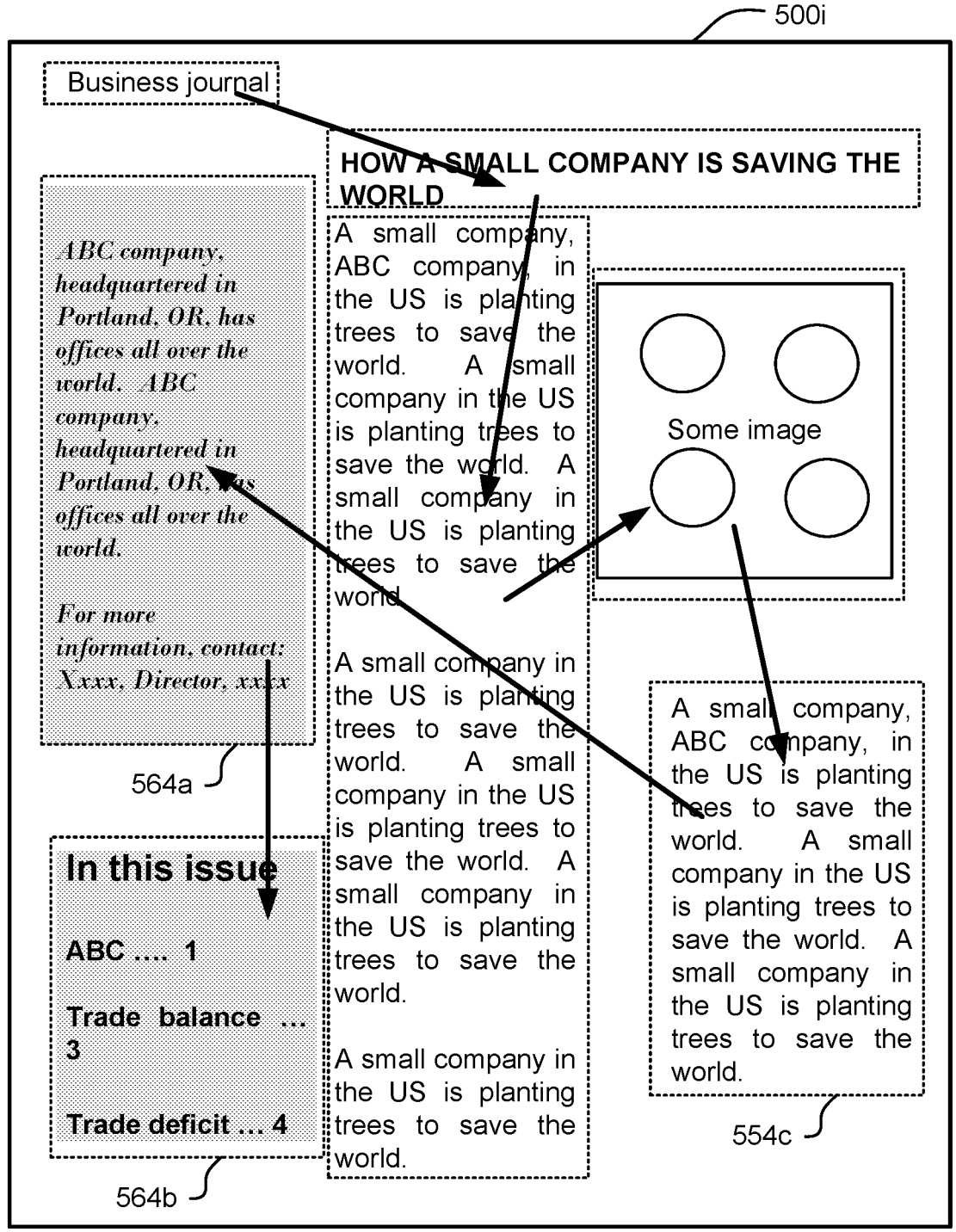

In another example, FIG. 5L illustrates ordering of regions in the document 500i of FIG. 5I, based on confirmation of the aside regions 564a, 564b, in accordance with an embodiment of the present disclosure. In the example of FIG. 5L, the content ordering module 170 orders the main content ahead of the asides 564a, 564b.

In yet another example, a user can configure the content ordering module 170 such that a first segment of content is ordered first, followed by asides associated with the first segment, followed by a second segment of content, followed by asides associated with the second segment, and so on. This is illustrated in FIG. 3D, where main content within the segment "gravity" is ordered first, followed by asides associated with the segment "gravity", followed by main content within the segment "Earth's gravity", followed by asides associated with the segment "Earth's gravity."

Referring again to the method 400 of FIG. 4A, once one or more regions of the document are ordered, the method 400 proceeds from 416 to 420, where the content presentation module 174 presents (or causes to present) content on the display screen 142, based on the determined order of the content. FIG. 3E illustrates presentation of at least a part of the content of the document 300 of FIG. 3A, and the content is presented based on the ordering illustrated in FIG. 3D.

Figure 6:
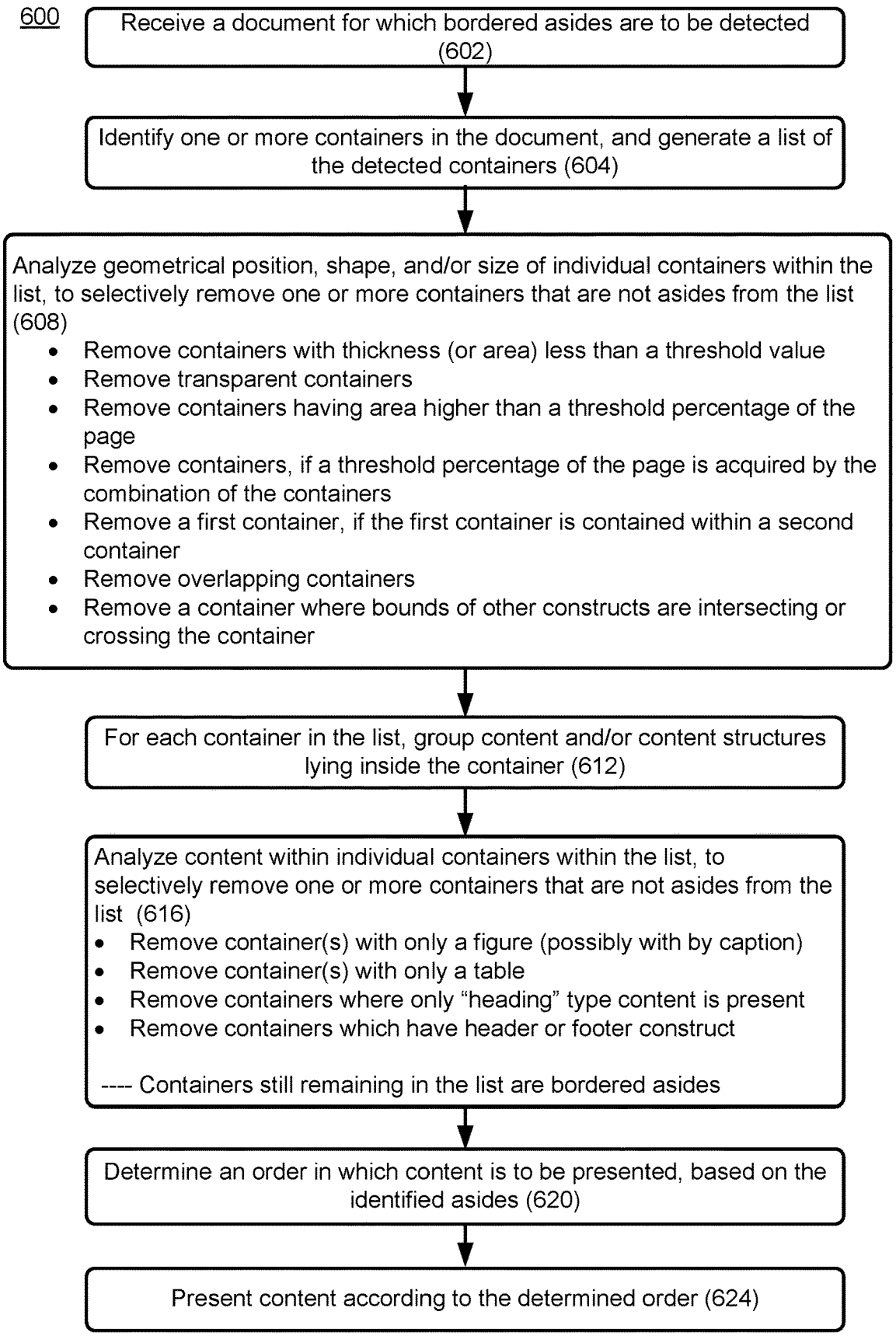
FIG. 6 is a flowchart illustrating an example method for detecting bordered asides in a document, in accordance with some embodiments of the present disclosure.

FIG. 6 is a flowchart illustrating another example method 600 for detecting asides in a document, in accordance with some embodiments of the present disclosure. Method 600 can be implemented, for example, using the system architecture illustrated in FIGS. 1 and/or 2, such as the bordered aside detection module 124. However other system architectures can be used in other embodiments, as apparent in light of this disclosure. To this end, the correlation of the various functions shown in FIG. 6 to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system.

In an example, while the method 400 of FIG. 4A (and associated discussion of FIGS. 4B-5L) can be used for detecting borderless and/or bordered asides, the method 600 can be used to detect bordered asides. Furthermore, FIGS. 7A-7F illustrate various examples documents that are discussed with respect to the method 600 of FIG. 6, in accordance with some embodiments of the present disclosure. Thus, FIGS. 6 and 7A-7F will be discussed in unison.

Referring to FIG. 6, at 602 of the method 600, a document is received. The received document may be the document 113 discussed with respect to FIG. 1, any of the documents discussed with respect to FIGS. 7A-7F, and/or any other documents discussed herein. In an example, asides are to be detected for the document. In an example, the received document has one or more bordered asides. In some embodiments, the document is received by the bordered aside detection module 124.

The method 600 then proceeds to 604, where the container identification module 126 detects or identifies one or more containers in the document, and generates a list of the identified containers. Thus, the list is a candidate list of possible aside containers. In an example, containers comprise one or more of graphic rectangles, graphic objects, and/or borders formed by horizontal and vertical lines.

In an example, a container is a region within the document, such as the regions discussed with respect to method 400 of FIG. 4A. For example, the term "container" is used in FIG. 6 with respect to bordered asides, while the term "region" is used in FIGS. 4A-4E with respect to bordered and borderless asides. Thus, containers are a subset of regions (e.g., a container can be a region).

Figure 7A:
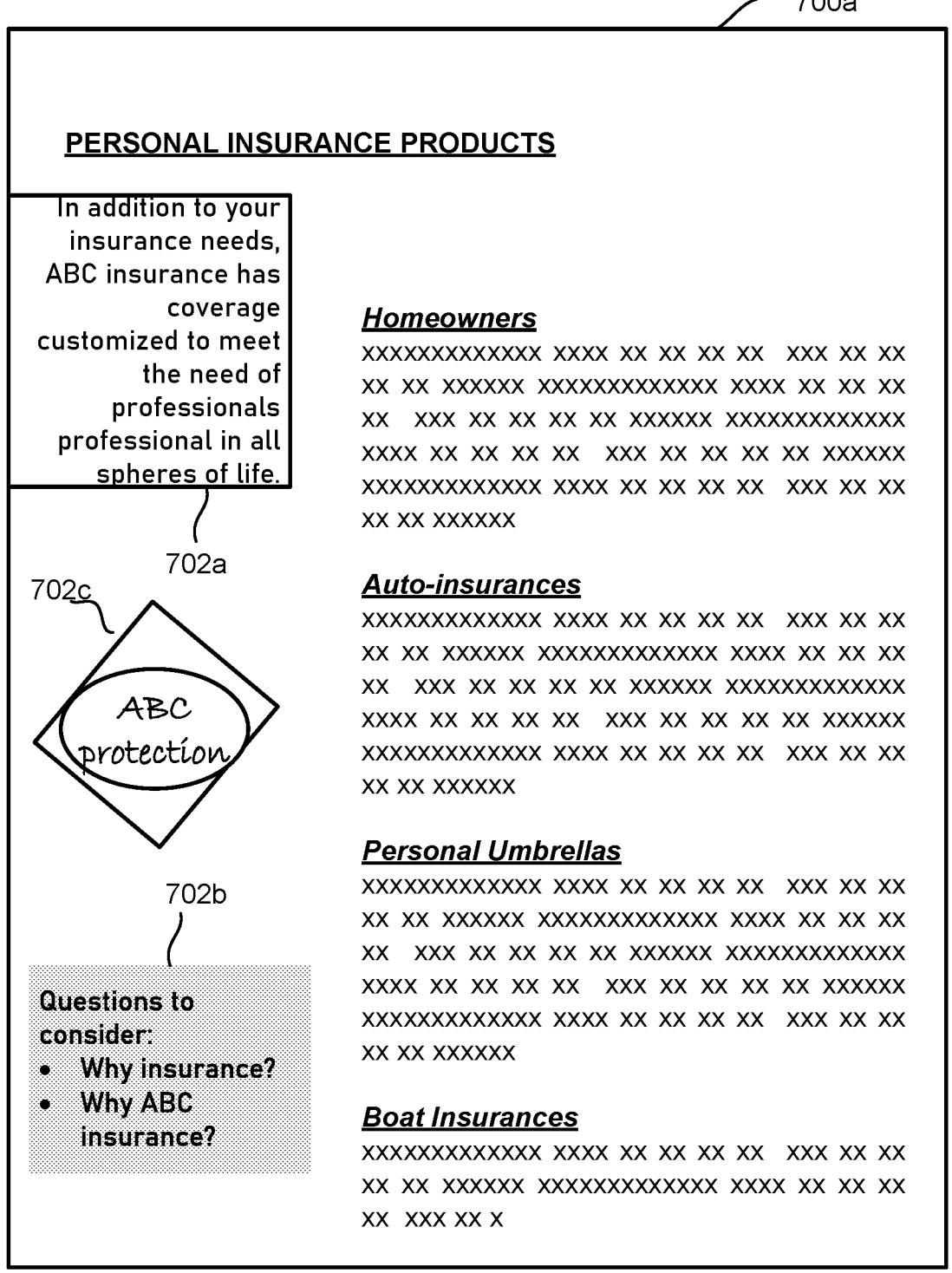

For example, FIG. 7A illustrates a document 700a comprising example containers 702a, 702b, 702c. As discussed, containers can include a graphic rectangle. As an example, the container 702b is a graphic rectangle, as it has different background relative to rest of the document.

As also discussed, containers can include graphic objects. As an example, the container 702c is a graphic object.

As also discussed, in some examples, containers can include content within borders formed by horizontal and vertical lines. In such an example, a container can be completely bounded by horizontal and vertical lines (or bounded by lines that may not be vertical and/or horizontal). As an example, the container 702a comprises content within bounded horizontal and vertical lines.

In an example, unstitched graphic objects can form rectangles visually, but are present as separate path objects in the content stream of the file. These are stitched together to form horizontal and/or vertical lines.

In an example, to identify a container within bounded horizontal and vertical lines, various vertical lines of the document are identified. If any two vertical lines are substantially identical (e.g., have same length, or lengths that are within 98% to 102% of each other) but horizontally separated, these two lines are taken as a pair and added to a vector. Similarly, various horizontal lines of the document are identified. If two horizontal lines are substantially identical but vertically separated, the two lines are taken as a pair and added to a vector. Once such pairs of horizontal and vertical lines are identified, if any of the horizontal pairs intersects with a vertical pair forming a closed rectangle, this is taken as a bounding box comprising a closed loop formed by vertical and horizontal lines, and is identified as a container.

Referring again to FIG. 6, the method 600 proceeds from 604 to 608, where the container analysis module 128 analyzes geometrical position, shape, and/or size of individual containers within the list. In some embodiments, based on such analysis, the container analysis module 128 selectively removes from the list one or more containers that are not asides.

FIG. 6 lists few example criteria within box 608 for removing containers from the list. Such a list of criteria is not exhaustive or limiting to the scope of this disclosure and merely an example. In an example, the container analysis module 128 can use one or more of the listed criteria, and/or may use additional criteria for removing containers from the list of containers.

Figure 7B:
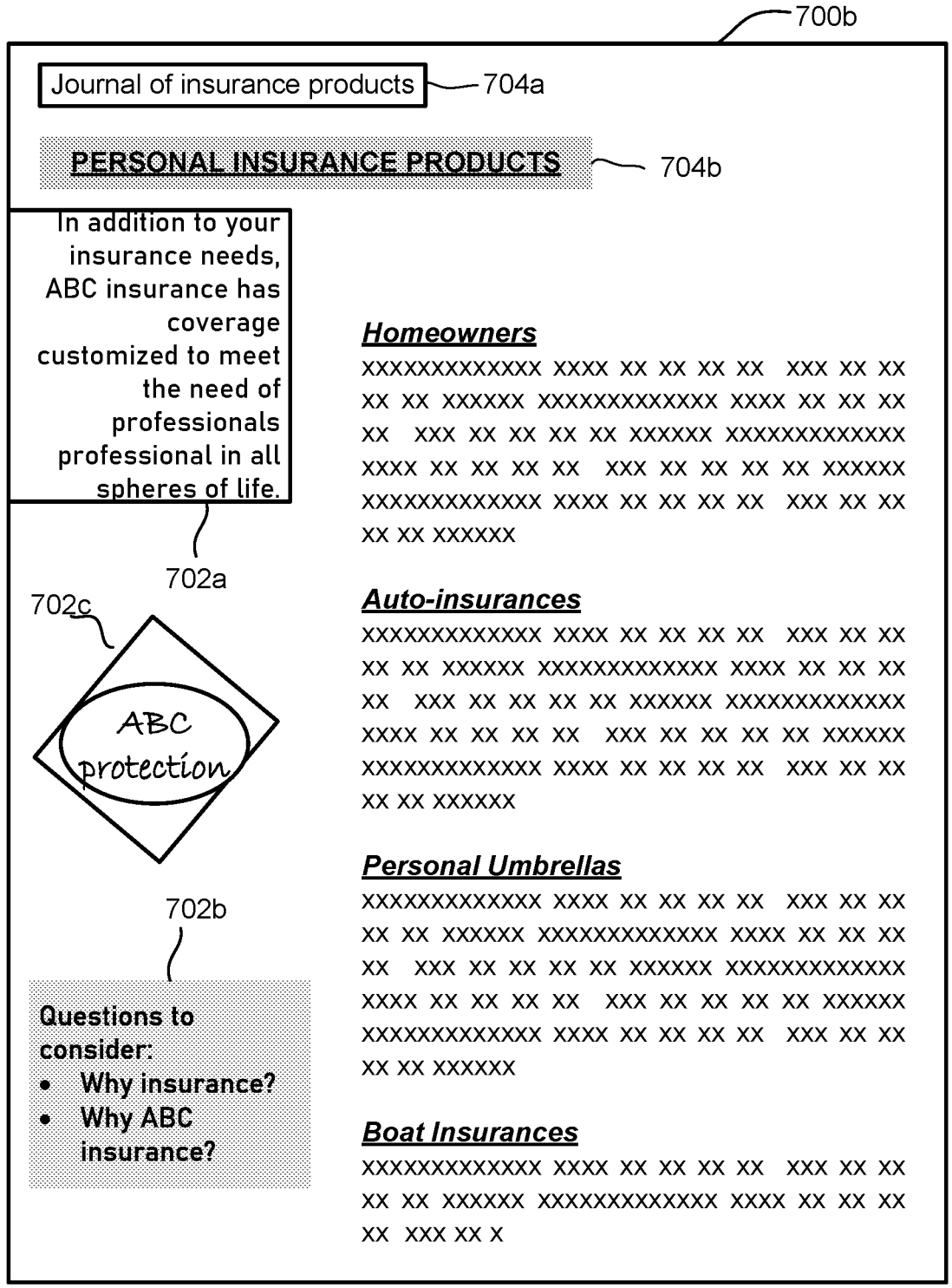

In some embodiments and as illustrated with respect to operations 608 of method 600, the container analysis module 128 removes from the list containers having thickness (or area) less than a threshold value. The thickness can be vertical and/or horizontal thickness (i.e., the thickness can be a height and/or a width of the container). For example, FIG. 7B illustrates a document 700b comprising example containers 702a, 702b, 702c, 704a, 704b. In an example, the containers 704a, 704b are removed from the list, for having thicknesses (i.e., height) that are less than a threshold value. Thus, relatively small containers are removed from the list. Similarly, relatively thin (e.g., small width) and vertically long containers are removed, relatively thin (e.g., small height) and horizontally long containers are removed, and/or containers with an area less than a threshold area are removed.

In some embodiments and as illustrated with respect to operations 608 of method 600, the container analysis module 128 removes containers having transparent background. For example, the container analysis module 128 checks background color of a container. If the background of the container matches with that of the page, then the container is removed from the list. Also, a container, which is marked as "Transparent" in its properties, may also be removed. In some embodiments, the removal of transparent containers may apply to containers that are not bounded by horizontal and vertical boundaries. In an example, contents can be bounded by a transparent box that is not visible to a user, but nonetheless present in content stream. The removal operation removes such containers from the list.

Figure 7C:
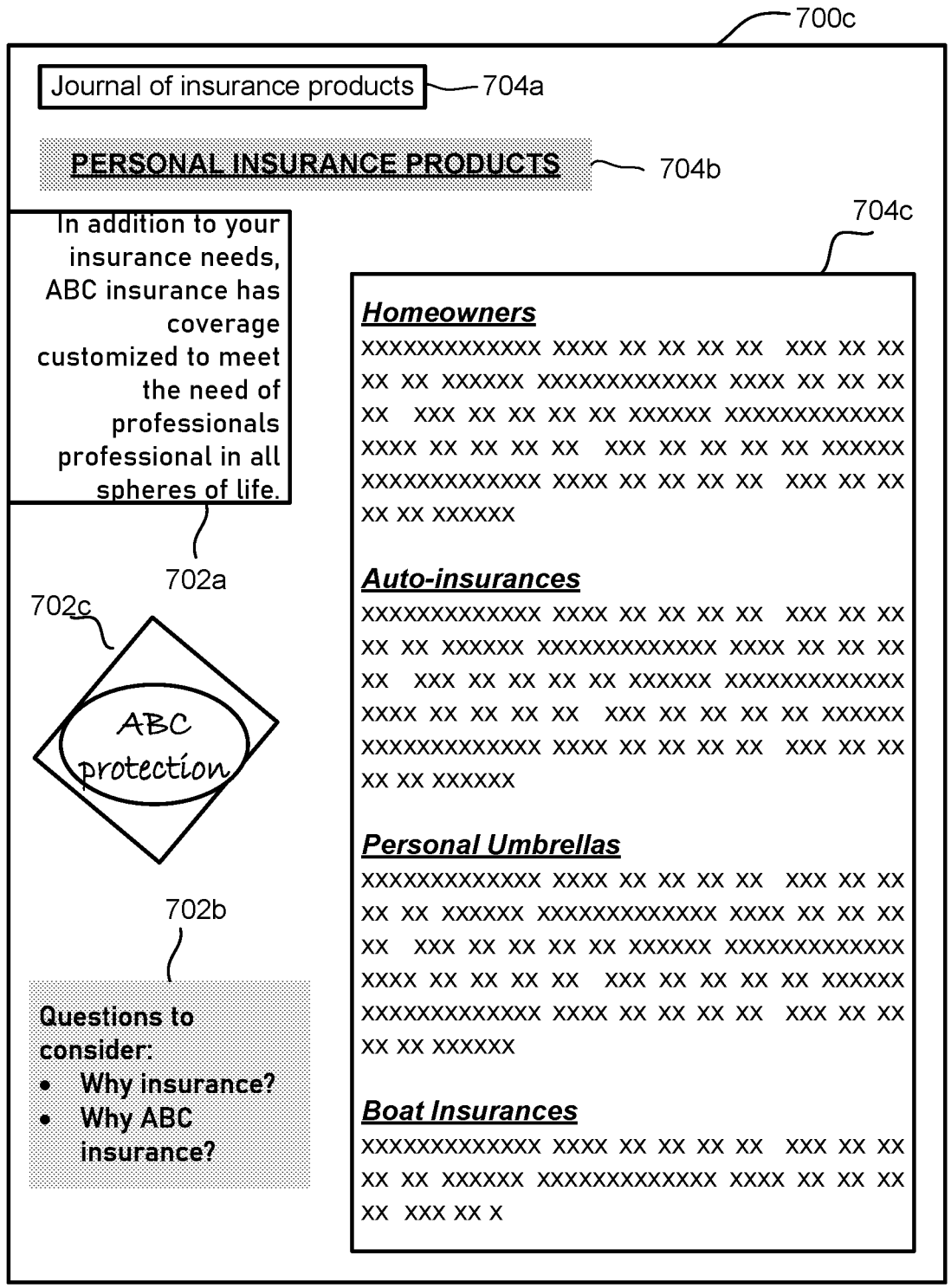

In some embodiments and as illustrated with respect to operations 608 of method 600, the container analysis module 128 removes containers having area that is higher than a threshold percentage of the page. The threshold percentage can be, for example, 45%, 50%, or the like. Thus, in an example, a container which covers more than, for example, 45% of page area will be removed. For example, asides are intended to be small, and if major page area is covered by a container, then such a container may not be treated as an aside. For example, FIG. 7C illustrates a document 700c comprising example containers 702a, 702b, 702c, 704a, 704b, 704c, where the container 704c is bounded by a visible rectangular boundary. As the container 704c occupies more than, for example, 45% of page area, the container 704c may be removed from the candidate list of aside containers.

Figure 7D:
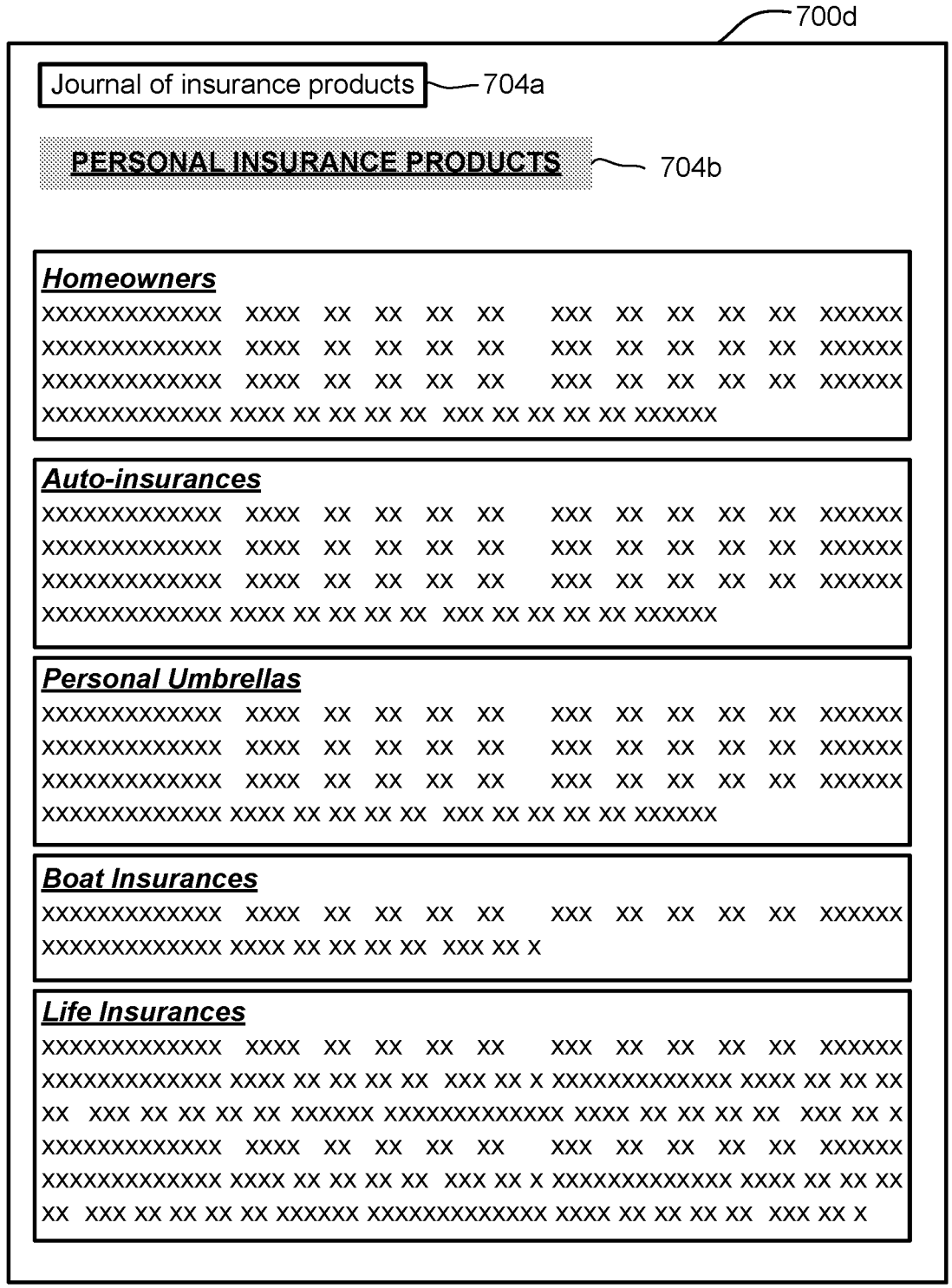

In some embodiments and as illustrated with respect to operations 608 of method 600, the container analysis module 128 removes a group of containers, if an entire page (or at least a threshold percentage of the page) is acquired by a combination of the group of containers. For example, all, or most of, the content on an example page may be written inside smaller bordered containers. In such cases, if total area covered by the containers is more than, for example, 80% of the page area, then one or more (or all) such containers may be removed. For example, FIG. 7D illustrates a document 700d in which various sections of the main content are written within corresponding bounding boxes. For example, the containers comprising various subsections of the main content, in combination, cover more than a threshold percentage of the page. Accordingly, one or more of such container, such as all such containers, are removed from the list.

In some embodiments and as illustrated with respect to operations 608 of method 600, the container analysis module 128 removes a first container, if the first container is contained within a second container—in such a case, the first container is merged with the second container. For example, if a container is completely contained in another container, then the outer container is kept in the list, and the inner container is removed. This routine may be executed after removing relatively large containers from the page, otherwise cases like page borders will always contain all the containers in the page and the smaller containers will be removed.

In some embodiments and as illustrated with respect to operations 608 of method 600, the container analysis module 128 removes overlapping containers. For example, there may be multiple containers for a particular area, where the containers may have similar bounds. In this case, merely one of such multiple containers is to be considered. Therefore, for at least partially overlapping containers, if the overlap percentage is greater than a threshold, then one or more such overlapping containers are removed, and at least one is kept in the list.

In some embodiments and as illustrated with respect to operations 608 of method 600, the container analysis module 128 removes a container where bounds of other constructs are intersecting or crossing the container. For example, in such cases, the bounds of constructs on that page may not be not correct, and marking a container to be an aside may lead to unexpected behavior while being displayed.

After removal of the containers from the list at 608, the remaining containers are probable aside candidates. After the removal is complete, the method 600 proceeds from 608 to 612, where for each container in the list, content and/or content structures lying inside the container are grouped (e.g., by the container analysis module 128). Thus, for example, the container 702*b* of the document 700*a* of FIG. 7A has a question and two bullet points—such contents are grouped and linked or associated to the container 702*b*.

The method 600 proceeds from 612 to 616, where the container analysis module 128 analyzes content within each individual containers in the list. In some embodiments, based on such analysis, the container analysis module 128 selectively removes from the list one or more containers that are not asides.

As discussed, the removals at 608 may be based on analysis of geometrical position, shape, and/or size of individual containers within the list. In contrast, the removals at 616 may be based on analysis of content within the containers.

FIG. 6 lists few example criteria within box 616 for removing containers from the list. Such a list of criteria is not exhaustive or limiting to the scope of this disclosure and merely an example. In an example, the container analysis module 128 can use one or more of the listed criteria, and/or may use additional criteria for removing containers from the list of containers.

In some embodiments and as illustrated with respect to operations 616 of method 600, the container analysis module 128 removes containers having only figure, and/or having only table type construct. For example, FIG. 7E illustrates a document 700*e* comprising example containers 702*a*, 706*a*, where the container 706*a* comprises only a table type construct. Accordingly, the container 706*a* is removed from the list of candidate aside containers at 616.

Figure 7F:
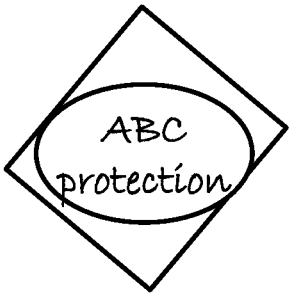

In some embodiments and as illustrated with respect to operations 616 of method 600, the container analysis module 128 removes containers having only heading type construct, as it is a case of bordered heading. For example, FIG. 7F illustrates a document 700*f* comprising example containers 702*f*1, 702*f*2, etc., where the containers 702*f*1, 702*f*2 comprise heading type construct. Accordingly, these containers are removed from the list of candidate aside containers at 616.

In some embodiments and as illustrated with respect to operations 616 of method 600, the container analysis module 128 removes containers having header or footer construct. For example, if the container 704*a* of document 700*c* of FIG. 7C is not eliminated at 608, this container will be eliminated at 616.

At the end of the removal operations at 616, the aside identification module 130 identifies the containers still remaining in the list as asides, such as bordered asides.

Once one or more asides are identified, the method 600 proceeds from 616 to 620, where the content ordering module 170 determines an order in which content is to be presented, based on the identified asides, e.g., as discussed herein previously with respect to operations at 416 of method 400 of FIG. 4A.

Once one or more regions of the document are ordered, the method 600 proceeds from 620 to 624, where the content presentation module 174 presents content on the display screen 142, based on the determined order of the content, e.g., as discussed herein previously with respect to operations at 420 of method 400 of FIG. 4A.

Numerous variations and configurations will be apparent in light of this disclosure and the following examples.

Example 1. A method for ordering content of a document for purpose of displaying the document, the method comprising: identifying, within the document, a plurality of regions; identifying, from the plurality of regions within the document, one or more asides and a plurality of non-aside main content regions, based at least in part on geometrical information and styling attributes associated with one or more of the plurality of regions of the document; determining a display order of the plurality of regions of the document, based at least in part on the identified one or more asides within the document; and causing display of the plurality of regions of the document in accordance with the display order.

Example 2. The method of Example 1, wherein identifying the one or more asides and the plurality of non-aside main content regions comprises: identifying probable candidate regions for asides from the plurality of regions, based on the geometrical information that includes a corresponding position of the one or more regions relative to the document, a corresponding size of the one or more regions, or both corresponding position and corresponding size of the one or more regions; and confirming one or more of the probable candidate regions as asides, based on the styling attributes of content within each of the probable candidate regions.

Example 3. The method of Example 2, wherein the asides are identified on a page of the document, and wherein identifying the probable candidate regions for asides from the plurality of regions comprises: identifying one or both of (i) a first region that does not intersect with either a top pane of the page or a bottom pane of the page, and (ii) a second region that is within either a left pane of the page or a right pane of the page; and identifying one or both the first region and the second region as the probable candidate region for asides.

Example 4. The method of Example 2, further comprising: identifying a first region and a second region of the plurality of regions that are located in horizontal symmetry with respect to each other within the document; and excluding the first region and the second region as probable candidate regions for asides.

Example 5. The method of any of Examples 2-4, identifying the probable candidate regions for asides from the plurality of regions comprises: identifying a region of the plurality of regions that has one or both of (i) a height that is more than a threshold height and (ii) a width that is more than a threshold width; and identifying the region as a probable candidate region for asides.

Example 6. The method of any of Examples 2-5, wherein the one or more of the probable candidate regions are on a page of the document, and wherein confirming the one or more of the probable candidate regions as asides comprises: determining (i) a first dominant font style of content within the page and (ii) a second dominant font style of content within a first candidate region of the probable candidate regions; and in response to the first dominant font style being different from the second dominant font style, confirming the first candidate region as an aside.

Example 7. The method of any of Examples 2-6, wherein the one or more of the probable candidate regions are on a page of the document, and wherein confirming the one or more of the probable candidate regions as asides comprises: determining a correlation between (i) font styles of content within the page and (ii) font styles of content within a first candidate region of the probable candidate regions; and in response to the correlation being less than a threshold, confirming the first candidate region as an aside.

Example 8. The method of any of Examples 1-7, wherein identifying the plurality of regions of the document comprises: identifying a plurality of objects within the document; for each object, identifying corresponding object information that includes one or both of (i) positioning information of the corresponding object, and (ii) styling information of the corresponding object; and grouping at least a first object and a second object into a first region of the plurality of regions, based on the object information associated with the first object and the second object, wherein the first region is separated by at least a threshold vertical gap from each of (i) a second region immediately above the first region, and (ii) a third region immediately below the first region.

Example 9. The method of any of Examples 1-8, wherein one or more of the one or more asides are borderless asides.

Example 10. The method of any of Examples 1-9, wherein identifying the one or more asides within the document comprises: identifying a first plurality of regions within the document, wherein each region is at least one of (i) a graphic object, (ii) a graphic rectangle having a background property different from a background property of a remaining section of the document, or (iii) an area bounded by horizontal and vertical lines; identifying a second plurality of regions by removing first one or more regions from the first plurality of regions, wherein the first one or more regions are not asides, and wherein the first one or more regions are removed based on one or more of geometrical position, shape, and size of the first one or more regions; and identifying second one or more regions as one or more asides by removing third one or more regions from the second plurality of regions, wherein the third one or more regions are not asides, and wherein the third one or more regions are removed based on analyzing content within the third one or more regions.

Example 11. The method of Example 10, wherein removing the first one or more regions comprises: determining that at least one of the first one or more regions (i) has one or both of a height and a width less than a threshold value, (ii) has one or both of a background and a bounding box that is or are transparent relative to a background of one or more sections of a page of the document, (iii) has an area that is less than a threshold percentage of the page, and/or (iv) is contained within or at least partially overlapping with another region; and removing the at least one of the first one or more regions from the first plurality of regions.

Example 12. The method of any of Examples 10-11, wherein removing the third one or more regions comprises: determining that at least one of the third one or more regions comprises (i) a figure, (ii) a table, (iii) a heading type content, (iv) a header type content, and/or (iv) a footer type content; and removing the at least one of the third one or more regions from the second plurality of regions.

Example 13. The method of any of Examples 10-12, wherein one or more of the one or more asides are bordered asides.

Example 14. The method of any of Examples 1-13, wherein determining the display order of the plurality of regions of the document comprises: ordering the plurality of non-aside main content regions of the document and the one or more asides, such that the one or more asides are in a logical reading order relative to the plurality of non-aside main content regions.

Example 15. A system for ordering content of a document for purpose of displaying the document, the system comprising: one or more processors; an aside detection system executable by the one or more processors to receive the document, and identify a region of the document as an aside, based at least in part on (i) a position of the region, a size of the region, or both position and size of the region, and (ii) styling attribute of content within the region; and a content ordering module executable by the one or more processors to determine a display order of content within the document, the display order based at least in part on the region being identified as an aside.

Example 16. The system of Example 15, wherein the position information associated with the region comprises one or both of: (i) position of the region relative to a page of the document, and (ii) a position of the region relative to another region on the page of the document.

Example 17. The system of any of Examples 15-16, wherein the aside detection system is executable to identify the region of the document as the aside by: first determining that the region (i) does not intersect with a top pane or a bottom pane of the page of the document and (ii) is contained within a left pane or a right pane of the page; second determining that the first region has (i) a height that is greater than a threshold height and (ii) a width that is greater than a threshold width; determining (i) a first dominant font style of content within the page and (ii) a second dominant font style of content within the region; third determining that (i) the first dominant font style is different from the second dominant font style, or (ii) a correlation between the first dominant font style and the second dominant font style is less than a threshold percentage; and identifying the region as the aside, based at least in part on one or more of the first determining, the second determining, and the third determining.

Example 18. A computer program product including one or more non-transitory machine-readable mediums encoded with instructions that when executed by one or more processors cause a process to be carried out for determining a display order of a page of a document, the process comprising: identifying a plurality of regions within a document, the plurality of regions including one or more aside content regions and a plurality of non-aside content regions; analyzing (i) geometrical information associated with one or more of the plurality of regions, and (ii) styling information within one or more of the plurality of regions; identifying one or more regions of the plurality of regions as aside regions, based on the analyzing; and determining a display order of the plurality of regions of the document, based at least in part on identifying the one or more regions as aside regions.

Example 19. The computer program product of Example 18, wherein the one or more regions include (i) a first region that is a borderless aside and (ii) a second region that is a bordered aside.

Example 20. The computer program product of any of Examples 18-19, wherein the document is one of a PDF (Portable Document Format) document or a HTML (Hypertext Markup Language) document.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for determining a modified display order of a document, the method comprising:
    identifying a plurality of regions within a document that includes first and second content sections, the document having a reading flow, wherein the plurality of regions are displayed in an initial order;
    segmenting the plurality of regions into a first subset of regions associated with the first content section and a second subset of regions associated with the second content section, wherein an end of the first content section is before a beginning of the second content section in the initial order;
    identifying at least some of the plurality of regions as main content regions that form part of the document;
    identifying at least some of the plurality of regions as aside regions that are visually distinct from the main content regions,
        wherein a plurality of first aside regions that are associated with the first content section are positioned within the first content section, and before the end of the first content section, in the initial order;
        wherein a first particular one of the aside regions that is visually distinct from the main content regions is identified based on a text style attribute of textual content in the first particular aside region; and
    determining a modified display order for the document (a) in which main content regions associated with the first content section are displayed before the plurality of first aside regions that are associated with the first content section and (b) in which the plurality of first aside regions that are associated with the first content section are displayed before regions associated with the second content section, wherein the plurality of first aside regions are moved to corresponding updated positions that are at an end of the first content section but before a beginning of the second content section in the modified display order.

2. The method of claim 1, wherein a second particular one of the aside regions is identified based on geometrical information that includes:
    a position, relative to a page of the document, of the second particular aside region;
    a size of the second particular aside region; or
    both the position and the size.

3. The method of claim 1, wherein each of the identified aside regions has an area that is less than a threshold percentage of an area of a page on which the identified aside region appears in the document.

4. The method of claim 1, further comprising:
    before identifying the aside regions or the main content regions, merging first and second regions of the plurality of regions to form a single merged region; and
    identifying the single merged region as one of the main content regions.

5. The method of claim 1, further comprising, before identifying the aside regions or the main content regions, merging two or more of the plurality of regions to form a single merged region.

6. The method of claim 1, further comprising:
    before identifying the aside regions or the main content regions, merging two or more of the plurality of regions to form a single merged region; and
    identifying the single merged region as one of the aside regions.

7. A system for determining a modified display order of a document, the system comprising one or more processors and an aside detection system executable by the one or more processors to:
    identify a plurality of regions within a document that includes first and second content sections, the document having a reading flow, wherein the plurality of regions are displayed in an initial order;
    segment the plurality of regions into a first subset of regions associated with the first content section and a second subset of regions associated with the second content section, wherein an end of the first content section is before a beginning of the second content section in the initial order;
    identify at least some of the plurality of regions as main content regions that form part of the document;
    identify at least some of the plurality of regions as aside regions that are visually distinct from the main content regions,
        wherein a plurality of first aside regions that are associated with the first content section are positioned within the first content section, and before the end of the first content section, in the initial order, and
        wherein a first particular one of the aside regions that is visually distinct from the main content regions is identified based on a text style attribute of textual content in the first particular aside region; and
    determine a modified display order for the document (a) in which main content regions associated with the first content section are displayed before the plurality of first aside regions that are associated with the first content section and (b) in which the plurality of first aside regions that are associated with the first content section are displayed before regions associated with the second content section, wherein the plurality of first aside regions are moved to corresponding updated positions that are at an end of the first content section but before a beginning of the second content section in the modified display order.

8. The system of claim 7, wherein a second particular one of the aside regions is identified based on geometrical information that includes:
    a position, relative to a page of the document, of the second particular aside region;
    a size of the second particular aside region; or
    both the position and the size.

9. The system of claim 7, wherein each of the identified aside regions has an area that is less than a threshold percentage of an area of a page on which the identified aside region appears in the document.

10. The system of claim 7, wherein the aside detection system is further executable by the one or more processors to, before identifying the aside regions or the main content regions, merge two or more of the plurality of regions to form a single merged region.

11. The system of claim 7, wherein the aside detection system is further executable by the one or more processors to:
 before identifying the aside regions or the main content regions, merge two or more of the plurality of regions to form a single merged region; and
 identify the single merged region as one of the aside regions.

12. A computer program product including one or more non-transitory machine readable media encoded with instructions that, when executed by one or more processors, cause a process for determining a modified display order of a document to be carried out, the process comprising:
 identifying a plurality of regions within a document that includes first and second content sections, the document having a reading flow, wherein the plurality of regions are displayed in an initial order;
 segmenting the plurality of regions into a first subset of regions associated with the first content section and a second subset of regions associated with the second content section, wherein an end of the first content section is before a beginning of the second content section in the initial order;
 identifying at least some of the plurality of regions as main content regions that form part of the document;
 identifying at least some of the plurality of regions as aside regions that are visually distinct from the main content regions,
  wherein a plurality of first aside regions that are associated with the first content section are positioned within the first content section, and before the end of the first content section, in the initial order, and
  wherein a first particular one of the aside regions that is visually distinct from the main content regions is identified based on a text style attribute of textual content in the first particular aside region; and
 determining a modified display order for the document (a) in which main content regions associated with the first content section are displayed before the plurality of first aside regions that are associated with the first content section and (b) in which the plurality of first aside regions that are associated with the first content section are displayed before regions associated with the second content section, wherein the plurality of first aside regions are moved to corresponding updated positions that are at an end of the first content section but before a beginning of the second content section in the modified display order.

13. The computer program product of claim 12, wherein a second particular one of the aside regions is identified based on geometrical information that includes:
 a position, relative to a page of the document, of the second particular aside region;
 a size of the second particular aside region; or
 both the position and the size.

14. The computer program product of claim 12, wherein each of the identified aside regions has an area that is less than a threshold percentage of an area of a page on which the identified aside region appears in the document.

15. The computer program product of claim 12, wherein the process further comprises:
 before identifying the aside regions or the main content regions, merging first and second regions of the plurality of regions to form a single merged region; and
 identifying the single merged region as one of the aside regions.

16. The computer program product of claim 12, wherein the process further comprises, before identifying the aside regions or the main content regions, merging two or more of the plurality of regions to form a single merged region.

17. The computer program product of claim 12, wherein each aside region in the plurality of first aside regions contains textual content.

\* \* \* \* \*